United States Patent
Scott et al.

(10) Patent No.: US 9,846,716 B1
(45) Date of Patent: Dec. 19, 2017

(54) DEIDENTIFICATION OF PRODUCTION DATA

(71) Applicant: HCA Holdings, Inc., Nashville, TN (US)

(72) Inventors: Alan Scott, Franklin, TN (US); Ryan Staggs, Brentwood, TN (US); Kevin Ronald Linkous, Thompson's Station, TN (US); Jack Hutchinson Blalock, Murfreesboro, TN (US); Mason Adam Blalock, Murfreesboro, TN (US)

(73) Assignee: HCA Holdings, Inc., Nashville, TN (US)

( * ) Notice: Subject to any disclaimer, the term of this patent is extended or adjusted under 35 U.S.C. 154(b) by 0 days.

(21) Appl. No.: 15/222,829

(22) Filed: Jul. 28, 2016

Related U.S. Application Data

(60) Provisional application No. 62/198,012, filed on Jul. 28, 2015.

(51) Int. Cl.
*G06F 17/30* (2006.01)
*G06F 9/54* (2006.01)

(52) U.S. Cl.
CPC ........ *G06F 17/30345* (2013.01); *G06F 9/546* (2013.01); *G06F 17/30876* (2013.01)

(58) Field of Classification Search
USPC ................................... 707/756, 607; 726/26
See application file for complete search history.

(56) References Cited

U.S. PATENT DOCUMENTS

| | | | |
|---|---|---|---|
| 6,732,113 B1 * | 5/2004 | Ober | G06F 19/322 |
| 7,299,493 B1 | 11/2007 | Burch et al. | |
| 7,865,376 B2 * | 1/2011 | Ober | G06F 19/322 |
| | | | 705/2 |
| 8,379,837 B2 | 2/2013 | Taylor et al. | |
| 8,473,452 B1 * | 6/2013 | Ober | G06F 17/30592 |
| | | | 707/607 |
| 8,930,404 B2 * | 1/2015 | Ober | G06F 17/30592 |
| | | | 707/607 |
| 2005/0068983 A1 | 3/2005 | Carter et al. | |
| 2006/0059189 A1 | 3/2006 | Dunki et al. | |
| 2008/0147554 A1 | 6/2008 | Stevens et al. | |
| 2008/0303811 A1 | 12/2008 | Van Luchene | |
| 2008/0319823 A1 * | 12/2008 | Ahn | G06Q 30/02 |
| | | | 705/51 |
| 2010/0042583 A1 | 2/2010 | Gervais et al. | |
| 2010/0192220 A1 | 7/2010 | Heizmann et al. | |
| 2012/0266250 A1 * | 10/2012 | Uhl | G06F 21/6254 |
| | | | 726/26 |
| 2016/0224803 A1 | 8/2016 | Frank et al. | |
| 2016/0306999 A1 * | 10/2016 | Beinhauer | H04L 63/0421 |

OTHER PUBLICATIONS

U.S. Appl. No. 15/222,840, filed Jul. 28, 2016, Final Office Action dated Jul. 18, 2017, all pages.
U.S. Appl. No. 15/222,843 filed Jul. 28, 2016, Final Office Action dated Aug. 14, 2017, all pages.

* cited by examiner

*Primary Examiner* — Hung T Vy
(74) *Attorney, Agent, or Firm* — Kilpatrick Townsend & Stockton LLP

(57) ABSTRACT

Systems and methods for generating alias records are described. The alias records, which include deidentified data, are generated from corresponding real records of actual users. As production data (e.g., messages) that identify the actual users flows through a network, the alias records are updated so as to correspond to the real records.

20 Claims, 18 Drawing Sheets

DEIDENTIFICATION OF PRODUCTION DATA

CROSS-REFERENCE TO RELATED APPLICATIONS

The present application is related to and claims the benefit of priority of U.S. Provisional Application No. 62/198,012, filed on Jul. 28, 2015, entitled "AUTOMATED TESTING AND DEIDENTIFICATION OF PRODUCTION DATA", filed on Jul. 28, 2015, the full disclosure of which is incorporated herein in its entirety. The present application is also related to and incorporates by reference for all purposes the full disclosures of co-pending U.S. patent application Ser. No. 15/222,840 entitled "TESTING USING DEIDENTIFIED PRODUCTION DATA" and co-pending U.S. patent application Ser. No. 15/222,843 entitled "ENHANCED DELIVERY OF DEIDENTIFIED PRODUCTION DATA", both of which are filed concurrently herewith.

BACKGROUND

This specification relates in general to deidentification of output data and, but not by way of limitation, to output data including electronic records associated with users.

Prior to applications or devices being added to a network, network operators may require that the applications and devices meet a certain level of operability with existing systems. For example, a new application may need to consistently process a certain percentage of transactions before it is approved for connection to the network. The application may be executed in a testing environment that attempts to replicate actual conditions in order to show its consistent processing. As part of replicating these actual conditions, it may be desirable for the application to use actual production data or at least data that is very similar to what it will encounter if connected to the network. The actual production data, however, may include sensitive information which the network operator has a duty to protect. Thus, sharing of production data for testing or otherwise may present challenges to network operators, developers, and the like.

SUMMARY

Embodiments described herein include systems and methods for generating deidentified production data, evaluating elements using deidentified production data, and providing deidentified production data. In some examples, a system for generating alias records is provided. The system includes a communication engine, a data store, a storage location, and a deidentification engine. The communication engine receives a message from a sending system within a network. The message includes a set of data segments storing data corresponding to a real record of a user and is generated in response to an event associated with the user. The communication engine also provides the message to a receiving system. The data store includes one or more association tables capable of storing associations between alias records and real records. The storage location is capable of storing the alias records. The deidentification engine identifies, based at least in part on the message, a real identity of the user. The deidentification engine also accesses, using the real identity of the user, the data store to determine that an alias record corresponding to the real record of the user does not exist. The deidentification engine also generates the alias record corresponding to the real record of the user by at least: determining an alias identity data attribute corresponding to the real identity of the user, adjusting a set of real data attributes belonging to the real record to generate a set of alias data attributes, and comparing the alias record and the real record to confirm that at least one real data attribute comprising first data is different from at least one alias attribute comprising second data. The deidentification engine also generates an identifier that associates the alias record with the real record. The deidentification engine also stores the generated alias record in the storage location.

In some examples, a system for testing elements using deidentified production data is provided. The system includes an initiation engine and an evaluation engine. The initiation engine provides one or more data dimensions for presentation. The one or more data dimensions identify characteristics of production data. The initiation engine also receives information about at least one selected data dimension of the one or more data dimensions. The initiation engine also, in response to receiving information about the at least one selected data dimension, generates a production data request that identifies one or more characteristics of the production data corresponding to the at least one selected data dimension and a date range for which the production data are requested. The production data corresponds to a real record of a user. The evaluation engine accesses a job schedule to identify the production data request. The job schedule includes a plurality of production data requests. The evaluation engine determines one or more systems from which a portion of the production data identified by the production data request can be received in the form of one or more messages. The evaluation engine also accesses the one or more systems to receive the portion of the production data from the one or more systems. The evaluation engine also uses the portion of the production data to evaluate an element of a network. The element includes a subsystem, an engine, an interface, a module, or a specialized device.

In some examples, a system for providing output data is provided. The system includes an initiation engine and a communication engine. The initiation engine receives a request from a user device for delivery of an output data package. The request includes one or more data attributes identifying one or more characteristics of output data that are requested for inclusion in the output data package. The initiation engine also identifies a requesting user associated with the request based on the request. The initiation engine also authenticates the requesting user using one or more authentication rules. The initiation engine also, in response to authenticating the requesting user, generates an output data request that identifies the one or more data attributes of the output data. The output data request includes at least one of a bulk data request or a feed data request. The initiation engine also identifies one or more systems for enabling the output data request. The communication engine obtains, from the one or more systems and based on the one or more data attributes, an alias record for inclusion in the output data package. The alias record corresponds to a real record of a user and includes a set of alias attributes that is generated by randomizing, anonymizing, and/or deidentifying real information in a set of real attributes belonging to the real record to generate alias information in the set of alias attributes. The communication engine also generates the output data package including the alias record. The communication engine also enables delivery of the output data package to the requesting user.

BRIEF DESCRIPTION OF THE DRAWINGS

Various embodiments in accordance with the present disclosure will be described with reference to the drawings, in which.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
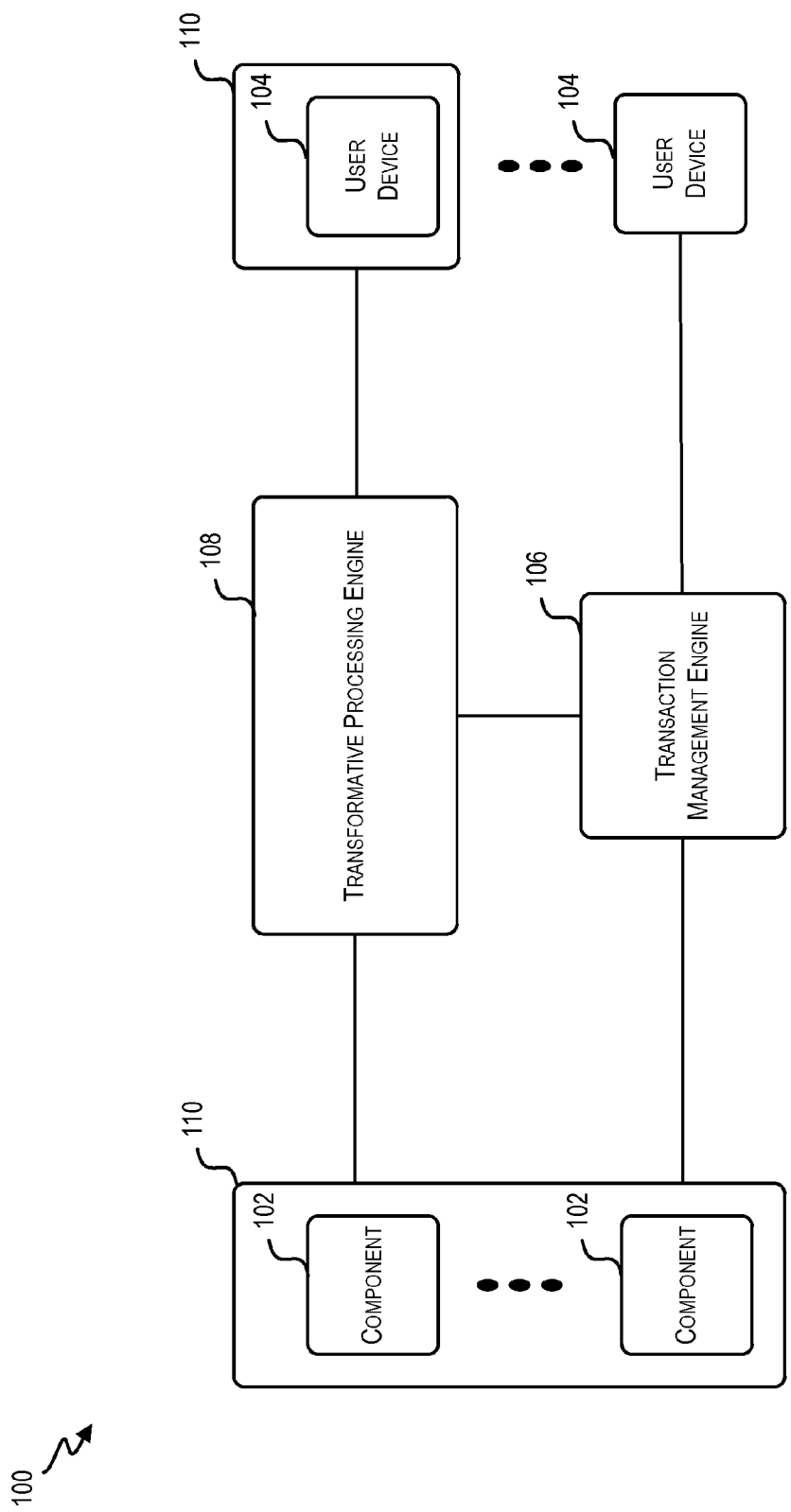
FIG. 1 is an example block diagram illustrating an environment in which techniques relating to deidentification of production data as described herein may be implemented, according to at least one example.

Referring first to FIG. 1, a block diagram of an embodiment of an interaction system 100 is illustrated. Generally, in interaction system 100, data can be generated at one or more system components 102 and/or user devices 104. Transaction management engine 106 can manage the flow of communications within interaction system 100. Transformative processing engine 108 can receive, intercept, track, integrate, process, and/or store such data.

Data flowing in interaction system 100 can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102 and/or data in a corresponding communication received from a user device.

As another example, a user device 104 can be configured to detect user input received at a user interface of the device. The user input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect user input requesting particular data, to generate a request communication (e.g., to be sent to transformative processing engine), to receive the requested data and/or to present the received data.

Data can include information that identifies a person, such as personal information and/or demographic information. For example, the information can identify a person's name, age, sex, race, physical address, phone number, email address, and/or social security number. Data may include information collected by a government agent, employer, insurer, or school or university, that relates to a past, present, or future condition or status (e.g., pertaining to employment, political involvement, occupation, health, or financial status) of any individual. For example, data may include information about past events.

Data may identify an entity being evaluated and/or one at least partly performing an evaluation. For example, a communication may identify a first company as one being evaluated and a second company as one evaluating a quality of a product of the first company. As another example, a communication may identify a first service plan of a first company as one providing an Internet network and may identify one or more users providing speed checks over the network.

The depicted engines, devices and/or components can communicate over one or more networks. A network of one or more networks can include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or transaction management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or processing focus. Exemplary types of facilities include server farm facilities, web-server facilities, data-storage facilities, technical-support facilities, telecommunication facilities, care facilities, and/or business operation facilities. For example, a first facility may include a structure at a first location at which one or more resources (e.g., computational resources, equipment resources, laboratory resources, and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another example, different facilities may include resources of similar or same types but may vary in terms of, for example, user accessibility, location, managing client, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing, and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client, or receiving a service from the client.

In some examples, one or more components 102 and one or more user devices 104 may communicate with transformative processing engine 108 and transaction management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., transaction management engine 106, an entity device, and/or a user device) and/or locally or remotely stored. In some examples, transformative processing engine 108 receives data in a particular format (e.g., the HL7 format) or conforming to any other suitable format and/or is configured to transform received data to conform with the particular format.

One or more components 102 of facility 110 can include and/or has access to a local or remote memory for storing generated data. In some examples, the data is stored by one or more servers local to facility 110. Such storage may enable facility 110 to retain locally data pertaining to its facility prior to (or in conjunction with) the data being shared with transformative processing engine 108 and/or transaction management engine 106. In some examples, the one or more servers of facility 110 share data directly with a record service (not shown), and the record service makes the data available to transformative processing engine 108 and/or transaction management engine 106. Once an electronic record is updated at facility 110, an indication of the update may be provided to the record service. The record service may then update a corresponding record associated with the electronic record.

The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from a component (or facility), the record service can identify a corresponding record and update the record to include the data (or processed version thereof). In some examples, the record service provides data to transformative processing engine 108.

Facility 110 can include one at which a resource is located and/or service is provided. Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private, and/or proprietary network or protocols. The use of one or more private and/or proprietary protocols can promote secure transfer of data.

Figure 2:
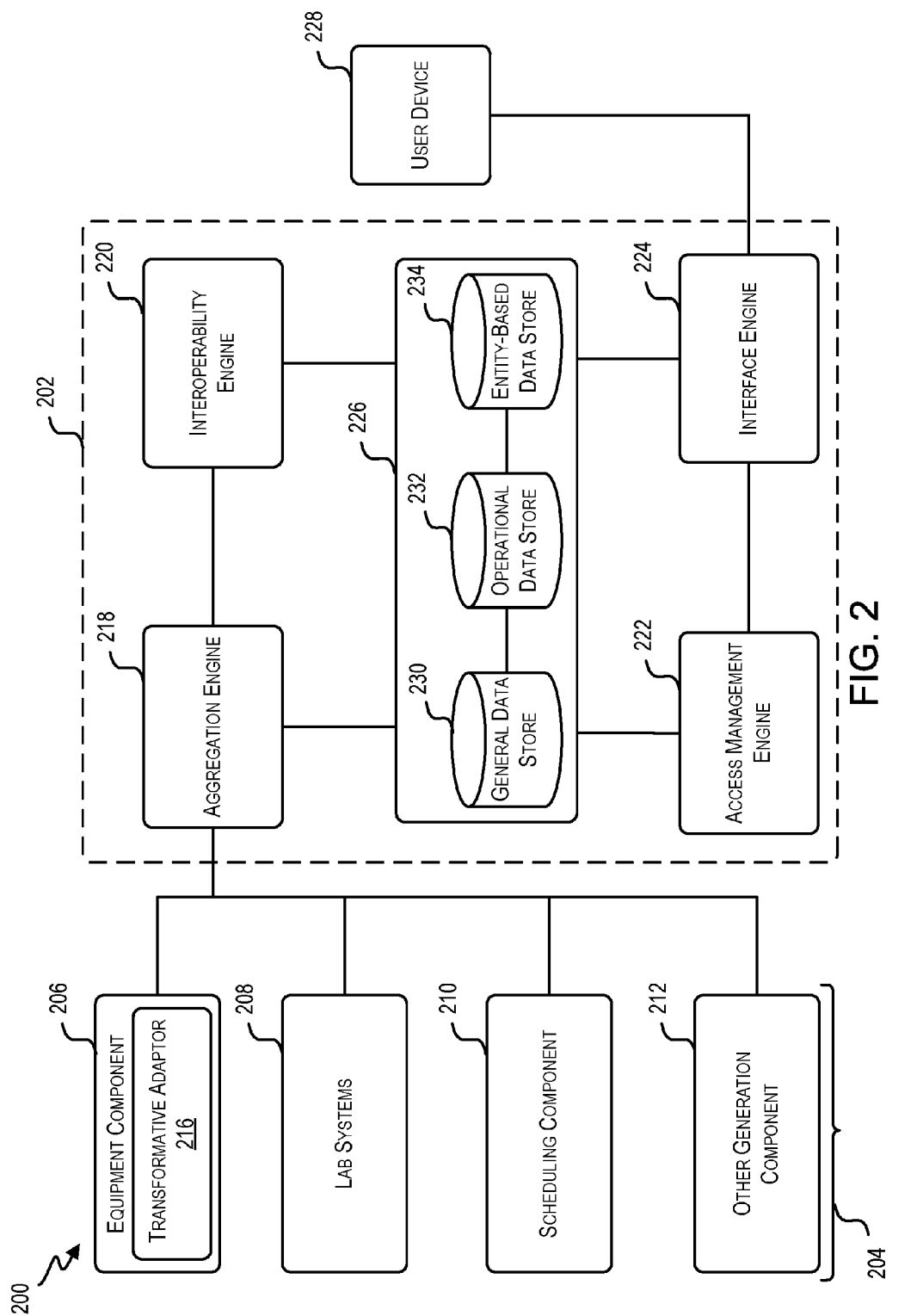
FIG. 2 is an example block diagram illustrating an environment in which techniques relating to deidentification of production data as described herein may be implemented, according to at least one example.

Referring next to FIG. 2, a block diagram of an example of an interaction system 200 is shown. Interaction system 200 includes a transformative processing engine 202. Transformative processing engine 202 is an example of transformative processing engine 108 discussed with reference to FIG. 1. Interaction system 200 also includes one or more generation components 204. In particular, one or more generation components 204 include an equipment component 206, a lab systems component 208, a scheduling component 210, and other generation component 212. One or more generation components 204 are examples of one or more components 102 discussed with reference to FIG. 1.

Generally, one or more generation components 204 include any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative processing engine 202 in accordance with techniques described herein may achieve this design—making large amounts of data, in many different originating formats available to various types of users, via one or more interfaces.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative processing engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative processing engine 202.

Scheduling component 210 includes any suitable computing devices used for business-related purposes with respect to interaction system 200. For example, scheduling component 210 can be configured to schedule a resource for allocation for a particular entity during a particular time slot. Scheduling component 210 can monitor a schedule for the resource and can identify one or more available time slots that may be secured by a particular entity. Upon receiving a scheduling indication, scheduling component 210 may update a schedule of a resource to reflect that a particular time slot is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative processing engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative processing engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative processing engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative processing engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine, and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative processing engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, have paid a subscription fee associated with access to data store 226, and the like. Access management engine 222 may also verify that the user device 228 has an IP address or geographical location that corresponds to an authorized list, that the user device 228 includes a plug-in for properly accessing data store 226, that the user device 228 is running certain applications required to access data store 226, and the like.

Interface engine 224 is configured to retrieve the data from data store 226 and provide one or more interfaces for interacting with elements of transformative processing engine 202. For example, interface engine 224 includes an interface by which an application running on user device 228 can access portions of data within data store 226.

Figure 3:
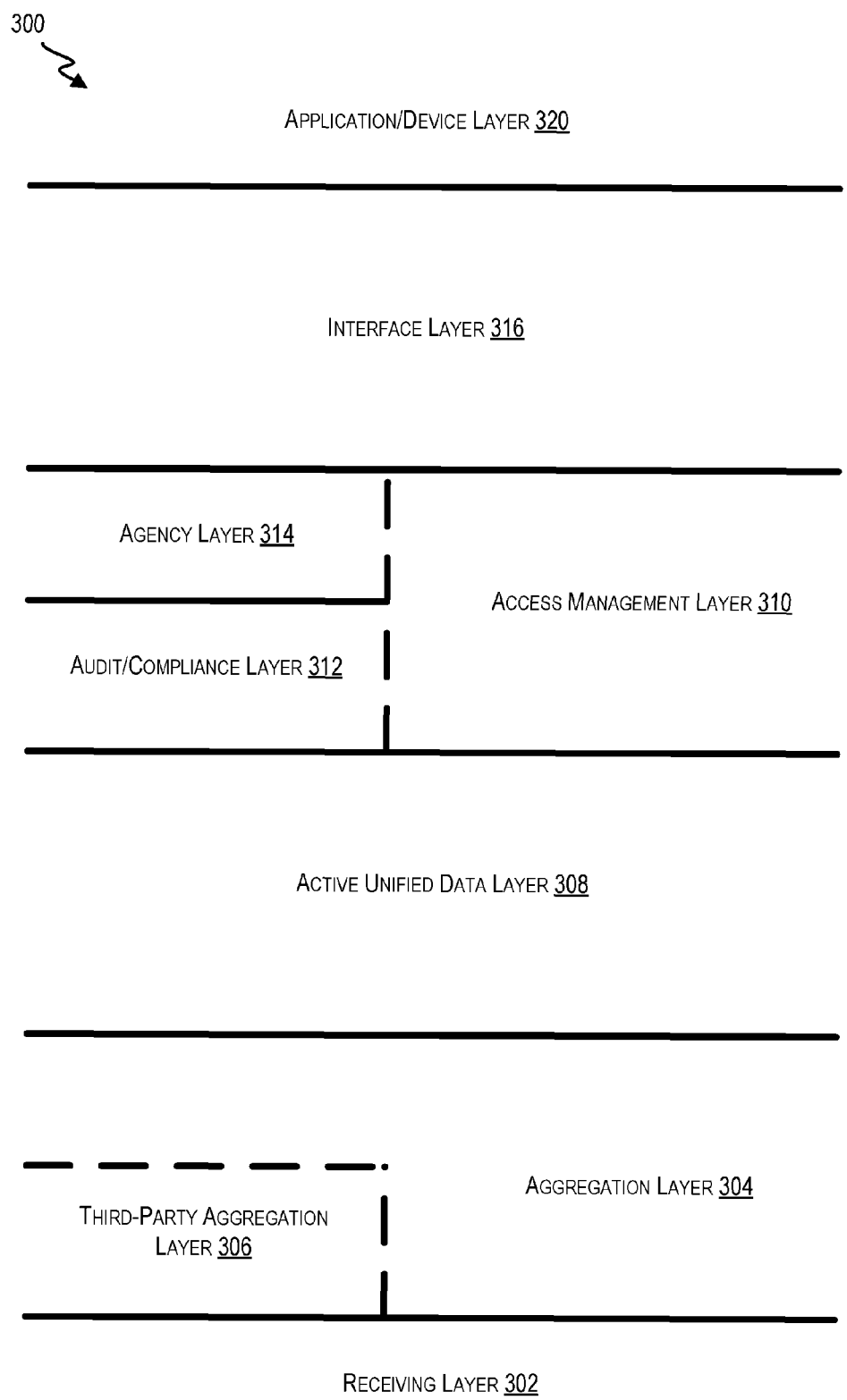
FIG. 3 is an example schematic model illustrating a network communication model in which techniques relating to deidentification of production data as described herein may be implemented, according to at least one example.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties.

Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
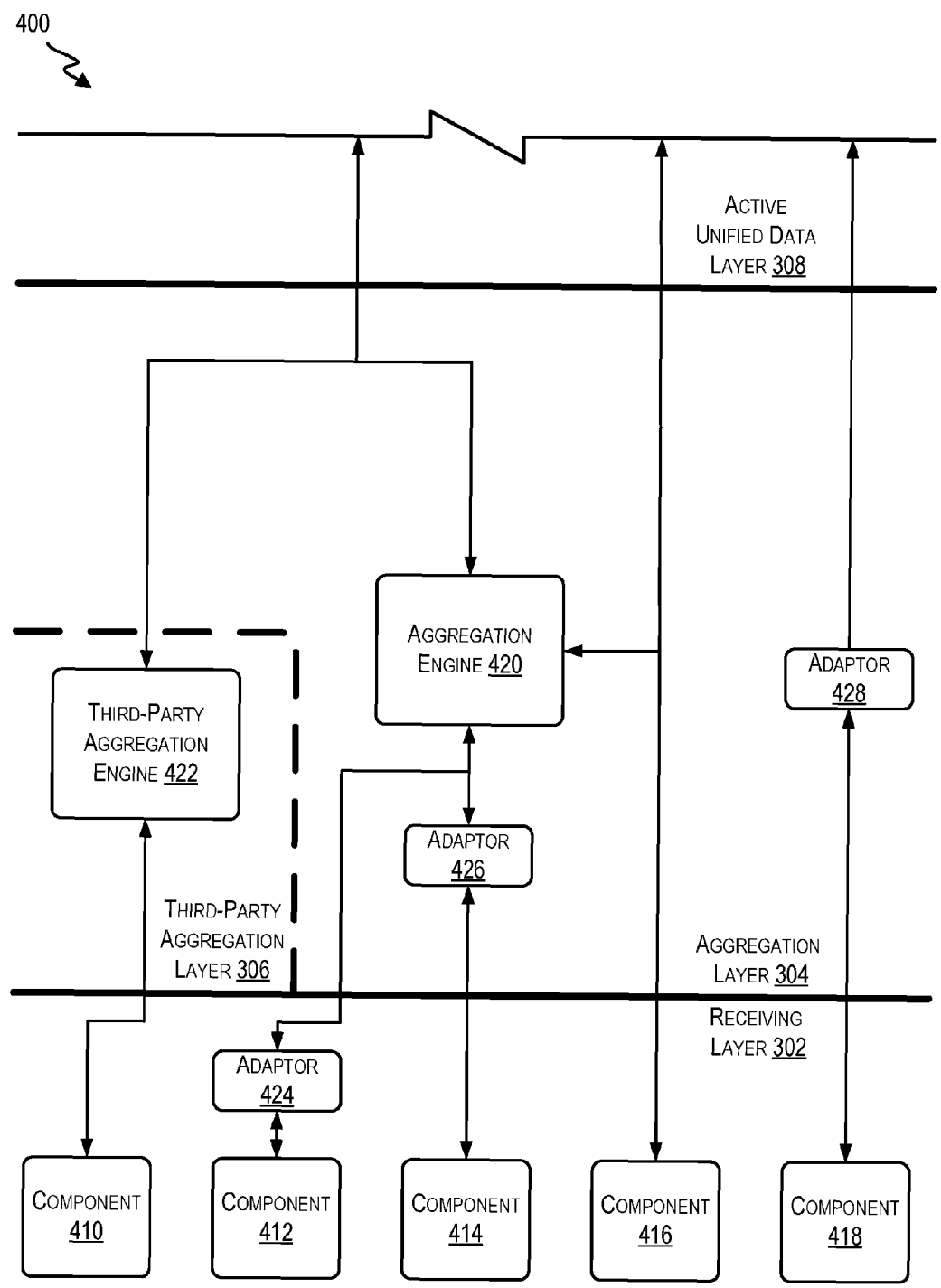
FIG. 4 is an example schematic model illustrating an aspect of the network communication model of FIG. 3 in more detail.

Turning next to FIG. 4, a diagram 400 is shown that depicts a portion of architecture stack 300 according to an embodiment. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

Figure 5:
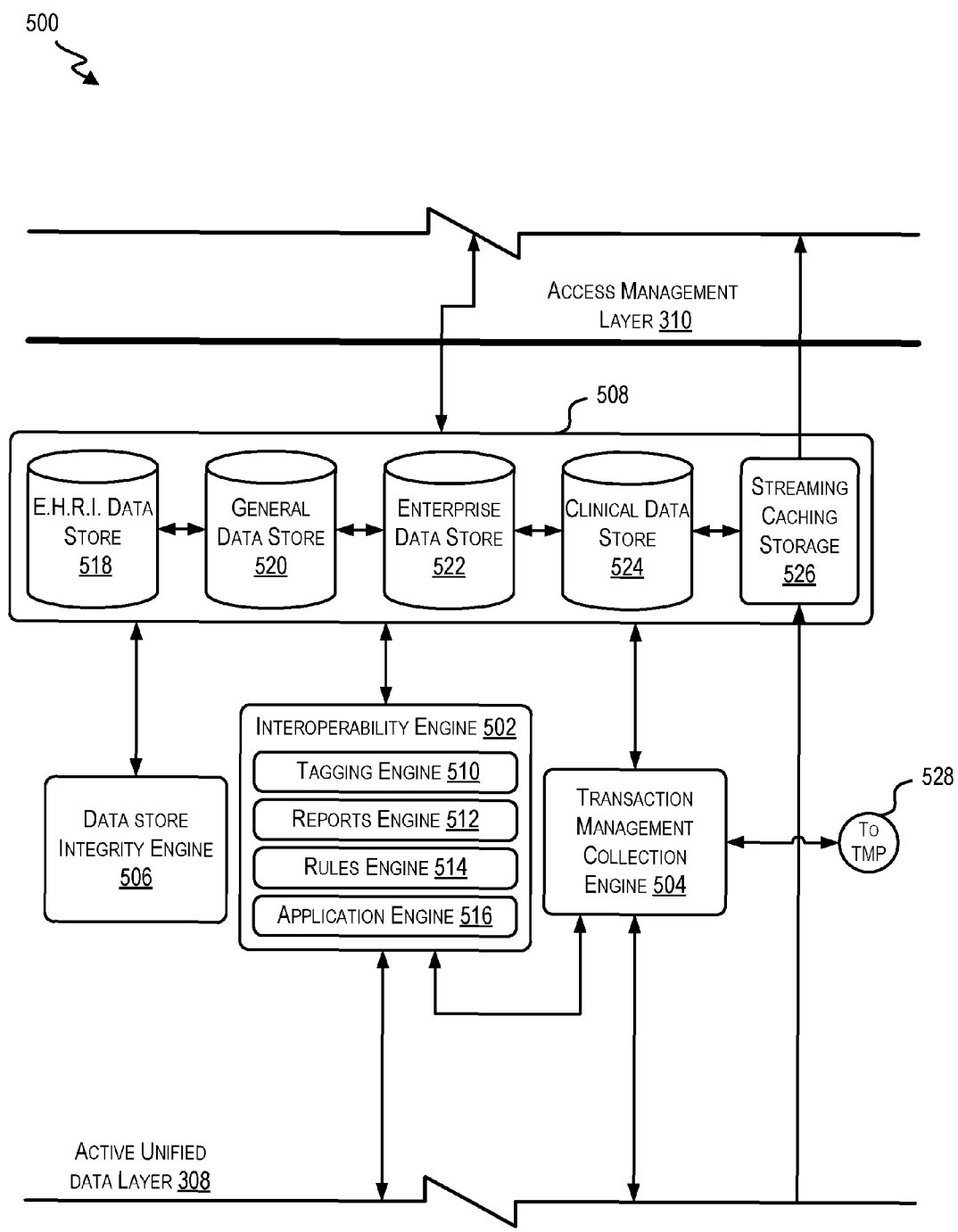
FIG. 5 is an example schematic model illustrating an aspect of the network communication model of FIG. 3 in more detail.

Referring next to FIG. 5, a diagram 500 is shown that depicts a portion of architecture stack 300 according to an embodiment. In particular, diagram 500 includes active unified data layer 308 and a portion of access management layer 310. Active unified data layer 308, as illustrated in diagram 500, includes an interoperability engine 502 (e.g., interoperability engine 220), a transaction management collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Transaction management collection engine 504 is implemented as part of transaction management engine 106. Transaction management collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304. The table may be stored in association with the transaction management platform 528.

In some examples, the table also includes information for tracking the progress of the message from an origination node to a destination node. For example, typically when a message (e.g., any communication of data) is first received by transformative processing engine 108 (e.g., interoperability engine 502), transaction management engine 106 (e.g., transaction management collection engine 504 of transaction management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to transaction management engine 106 that it saw the message. In this manner, transaction management engine 106 may enable end-to-end tracking of messages for the life of the message.

In one example, the messages are requests. The requests may be generated based om user input at one of the components. The requests may be received by transformative processing engine 108 and integrated into the system. In some examples, transaction management engine 106 may be notified that the requests have been received and may therefore be configured to generate message IDs for each request. These message IDs may then be associated with each of the requests. As the requests continue to move throughout the interaction system (e.g., away from transformative processing engine 108), transaction management engine 106 may be track their movement using the message IDs. If one of the requests does not make it to its destination, transaction management engine 106 (or part of the transaction management platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, transaction management engine 106 (e.g., transaction management collection engine 504 of transaction management engine 106) may receive the message and/or message identifier directly from one of components 410-418. For example, one of components 410-416 may be configured to generate the unique message identifier and/or communicate directly with transaction management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, transaction management collection engine 504 provides unique message identifiers to other elements of the interaction system to monitor the messages as they move throughout the interaction system. Transaction management collection engine 504 also provides a portion of the unique message identifiers to a transaction management platform (indicated by a circle 528) for further analysis of the message identifiers. Such analysis may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage business rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

[Within record data store 518 is retained data including electronic record information. In some examples, the information within record data store 518 is organized according to entity identifying information. Thus, record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. In some examples, the operational data ware house 522 includes data pertaining to decision making as discussed herein and other data typically used by conventional business concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of personal record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
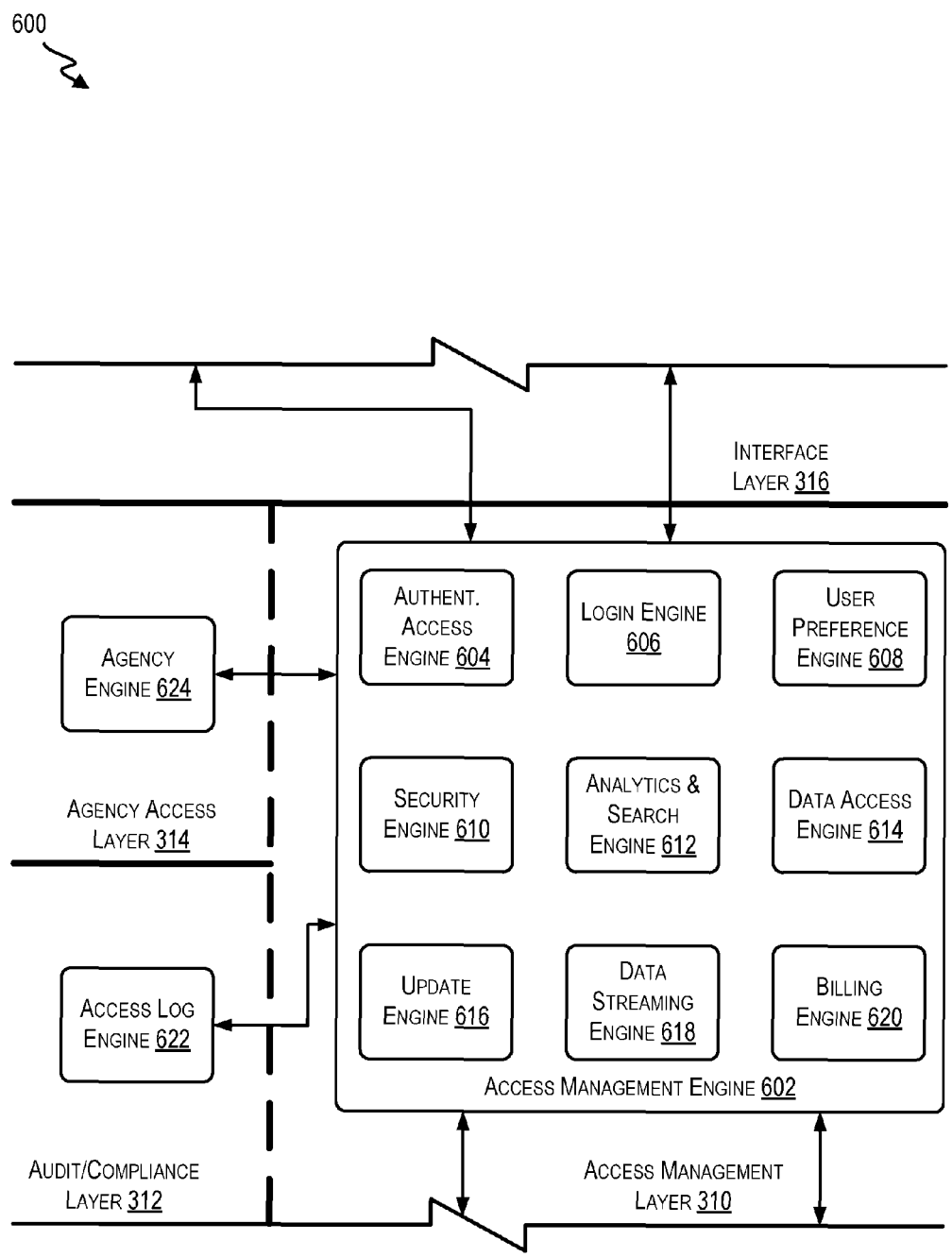
FIG. 6 is an example schematic model illustrating an aspect of the network communication model of FIG. 3 in more detail.

FIG. 6 shows a diagram 600 which depicts a portion of architecture stack 300 according to an embodiment. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative processing engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which users are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions, and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed; a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 can identify one or more entities (e.g., governmental agencies) that are to receive reports pertaining to operations or events and what types of data are to be reported to those entities. Agency engine 624 can then collect the pertinent data, potentially format and/or analyze the data, and facilitate transmission of (e.g., raw, formatted and/or analysis of) the data to the appropriate agency.

Figure 7:
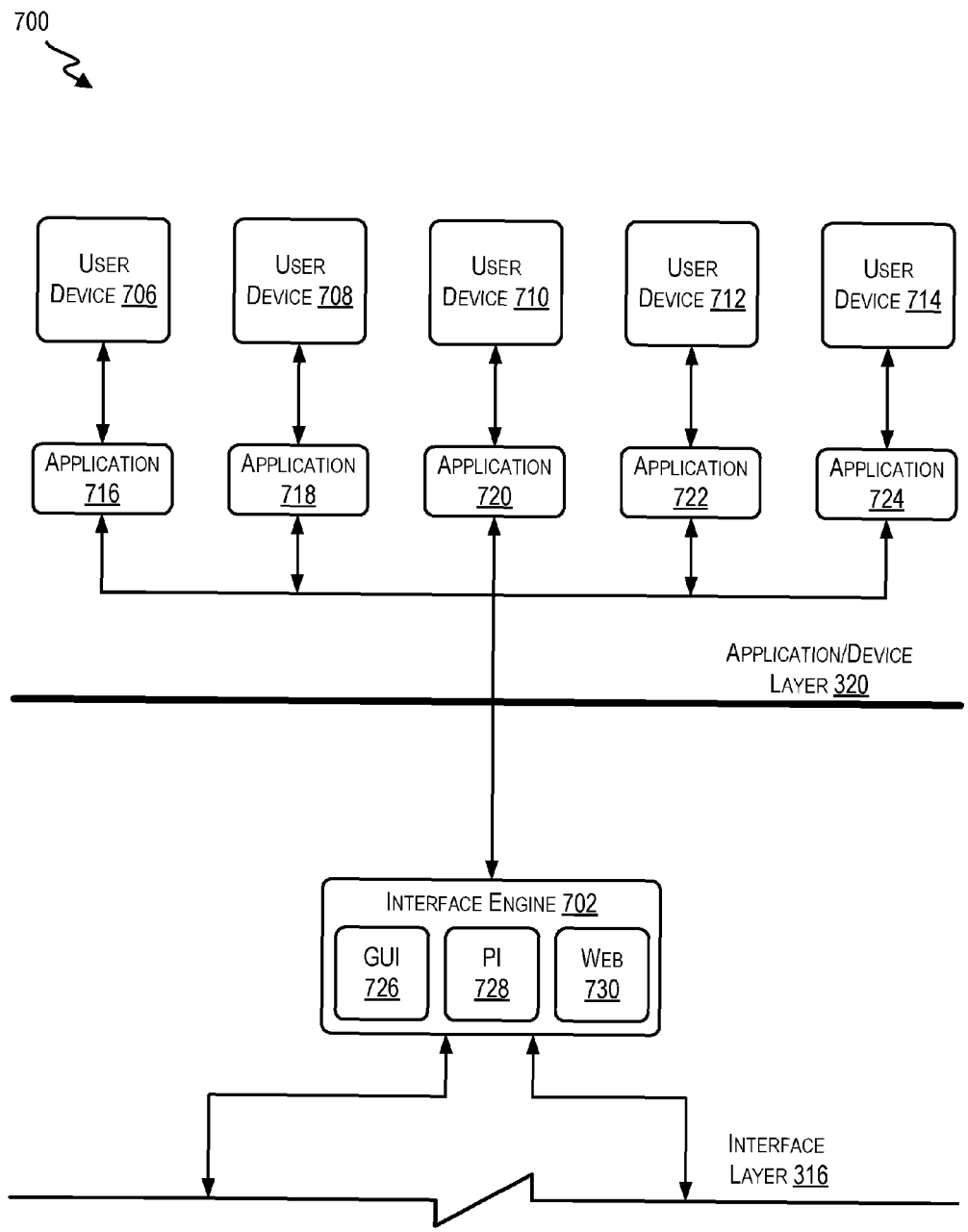
FIG. 7 is an example schematic model illustrating an aspect of the network communication model of FIG. 3 in more detail.

FIG. 7 shows a diagram 700 which depicts a portion of architecture stack 300 according to an embodiment. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for a particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, and move more relevant content to the foreground, move less relevant content to the background, populate forms for the entity.

In another example, application 722 may be specific for nurses or types of nurses. In this example, application 722 may include dashboards, widgets, windows, icons, and the like that are customized to individual nurses. Similar to the example discussed above pertaining to the doctor, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

In some examples, application 724 may be a business intelligence application. In this example, application 724 is used to display business information generated by components of the interaction system. This business information can be used for operations, planning, and forecasting. Such business information may include data because such data may impact operations, planning, forecasting, and the like. Accordingly, application 724 may present de-identified information in the form of one or more metrics, indicators, or the like as they pertain to business intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
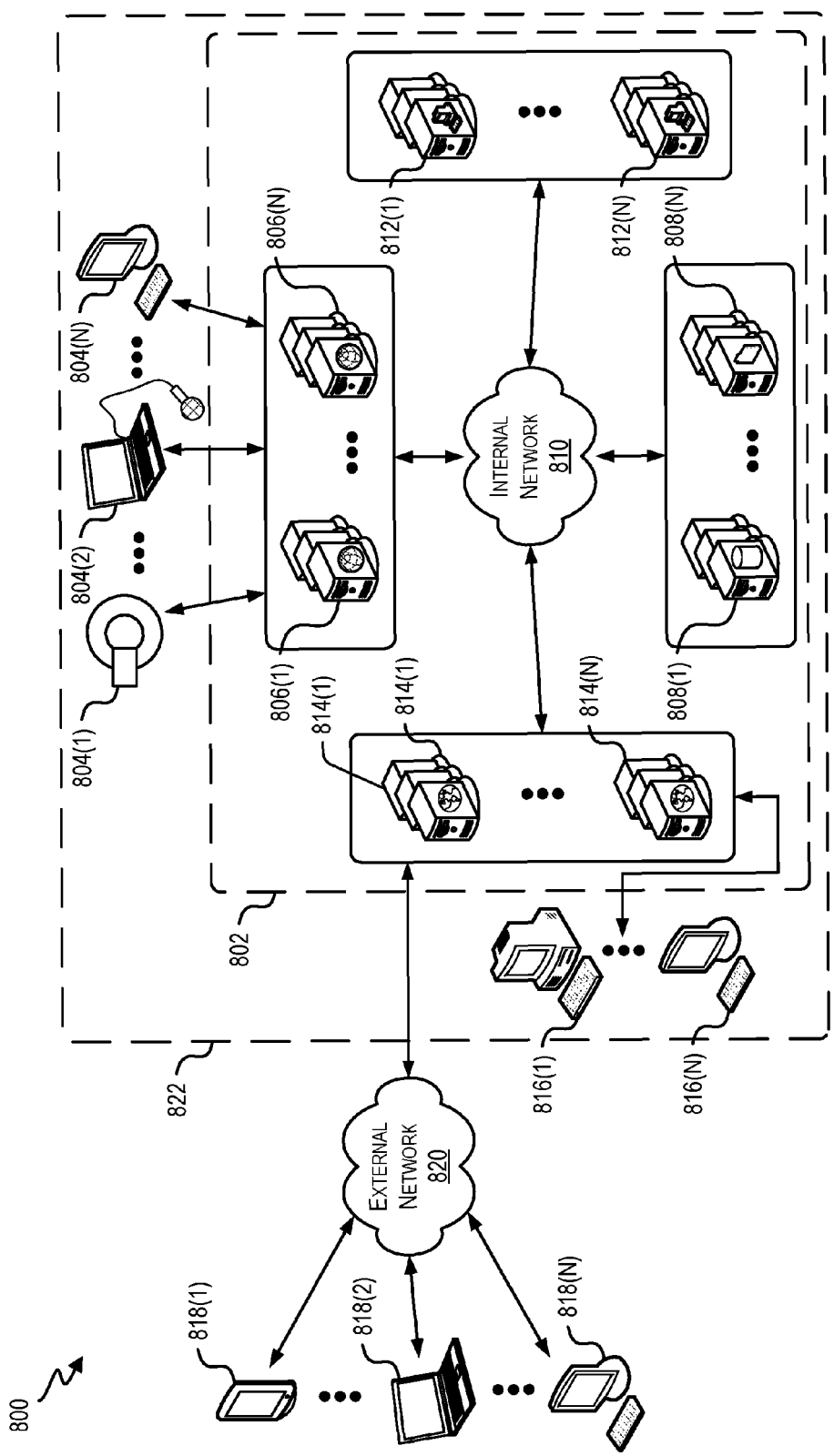
FIG. 8 is an example schematic architecture illustrating a network in which techniques relating to deidentification of production data as described herein may be implemented, according to at least one example.

Turning now to FIG. 8, an interaction system 800 is shown in accordance with an embodiment. Interaction system 800 includes an internal organization 822 including a transformative processing engine 802. The transformative processing engine 802 is an example of transformative processing engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The present disclosure describes embodiments of a deidentification platform. The deidentification platform may be configured to evaluate elements within a network (e.g., systems, interfaces, applications, engines, and the like) using actual real-time production data and output actual real-time production data to entities interested in receiving such data (e.g., third-parties of the network operator that also desire to run tests using the production data), all in a manner that removes sensitive information from the data, but still keeps the data relevant for particular purposes. For example, in a particular context, production data includes data in the form of messages generated by components of the network and which flow between the components. Many of these messages will include sensitive data that are capable of identifying users of an organization associated with the network, i.e., the entity that operates the network. This identifying data oftentimes includes data that are relevant to the users and similarly relevant to the elements which will process the production data. The organization, however, has an obligation to protect this identifying data from accidental and purposeful disclosure. On the other hand, testing with actual real-time production data, including relevant identifying data, may provide better results compared to using stale data or data that has been purged of all identifying data. This may be because using production data that includes relevant identifying data closely, if not perfectly, replicates actual production data that will be or is currently being processed by the element being tested.

In one example of the present disclosure, in order to strike a balance between disclosing identifying data and providing production data that is timely, complete, relevant, and accurate, a deidentification engine is provided within the deidentification platform. In its most basic sense, the deidentification engine is configured to alter characteristics of production data in a manner that makes identifying a user or record of a user from the production data extremely difficult, if not entirely impossible. In some examples, this is achieved by generating an alias record that corresponds to a real record of a user, updating the alias record when the real record is updated, and using the alias record for production data requests and production data tests, instead of the real record. The alias record is generated by replacing certain fields of the real record that include identifying data with deidentified data (i.e., data generated for purposes of the alias record that is not capable of identifying the user), randomized data (i.e., data generated based on real production data that shares at least some characteristics with the real record), or anonymized data (i.e., real production data that has been randomly selected). Thus, for all intents and purposes, the alias record includes a complete record mirroring the real record of the user, but that has been altered to no longer identify the user. For example, it identifies an alias user with a first and last name, a government identifier, an account identifier, an address, a date of birth, a phone number, a provider identifier, an identification of a family member, an identification of authorized users, and an identification of coverage entities, all of which are distinct from the same information for the user in the real record. The deidentification engine determines, based on aspects of the real record or a message that identifies the real record, which fields will be replaced with which types of the deidentified, randomized, or anonymized data. A minimal association (e.g., an identifier) is retained that ties the alias record back to the real record. This enables present and future changes made to the real record to be persisted back to the alias record. In this manner, the alias record continues to mirror the real record. The deidentification engine operates from a transactional perspective in order to ensure that aspects of the alias record are kept current compared to the real record. For example, the deidentification engine intercepts messages on a transactional basis that flow throughout the network and determines, from the messages, whether alias records exists for users identified by the messages and, from the messages, whether alias records should be updated based on the content of the messages. Based on these determinations, the deidentification engine either generates a new alias record or updates an existing alias record. In this manner, the alias records are kept current compared to the real records and can be used for testing and/or shared with outside entities with decreased concern that doing so will disclose the identity of the users to whom the real records belong.

In one example of the present disclosure, the deidentification platform is used to implement an evaluation system for evaluation of elements using production data including alias records. The system can be used by users of a network to configure evaluation of elements of the network. To begin, a user interface is presented on a user device associated with a user. The user interface includes one or more selectors for selecting characteristics of the production data that will be used during the evaluation. For example, depending on the element being evaluated, production data from a particular region, facility, application, or any other suitable characteristic for filtering the production data may be needed. In some examples, a type of message is also relevant to the element being evaluated, in addition to a range corresponding to the production data. The range may indicate a past range, in which case the production data will correspond to processed events that have taken place in the past. The range may also indicate a future range, in which case the production data will correspond to events that will be processed in the future. In some examples, the evaluation system evaluates production data collected from an archive which corresponds to the past production data and production data collected in real-time. Each of the characteristics (e.g., user, outcome associated with user, treating user, date of birth, year of birth, present conditions of user, methods of responding to present conditions, and the like) may be considered a data dimension (e.g., a data attribute) of the production data. The options may act as filters to filter production data based on the various data dimensions. In some examples, another option may be presented to the user that relates to deidentification of the production data. Toggling of this option will cause the deidentification engine to generate alias records as described herein. In some examples, the production data is deidentified (i.e., the alias records are generated and updated) as a default. And overriding the default may require that the user be a certain type of authorized user. For example, an administrator of the network. Once the data dimensions are selected, a production data request is generated and passed to a job scheduler. The job scheduler operates periodically, according to a fixed schedule, or in some other way to determine whether the production data request has been fulfilled for the particular period, schedule, or otherwise. When it is determined that a production data request has not been fulfilled, an evaluation engine determines which elements of the network are to be tested based on the production data request and which systems will provide the production data to fulfill the request. The evaluation engine accesses the identified systems to acquire the production data and uses the production data to evaluate a particular element of the network. Evaluation may include the evaluation engine simply passing the collected production data into the network as a series of transactions that are processed by the element being tested. The evaluation may be ongoing and, in some examples, may provide for replay of transactions. This may include end-to-end tracking of transactions to determine whether the transaction was successfully acknowledged by the element, negatively acknowledged, lost in transmission, or otherwise acknowledged.

In one example of the present disclosure, the deidentification platform is used to implement a system for providing production data including alias records. The system can be subscription-based and may be used by a user to receive a production data feed from a network including a plurality of devices, components, elements, and the like. In some examples, the system may provide alias records using a subscription-based model, using a service-based model which may be accessed using any suitable combination of interfaces (e.g., application program interfaces, web interfaces, user interfaces, etc.), and the like. The alias records may be shared as a bulk set (e.g., 10,000 alias records having X, Y, and Z characteristics), which are not updated on an ongoing basis. The alias records may also be shared under an subscription arrangement wherein the subscribed system receives not only an initial set of alias records, but also receives updated version of the alias records as the deidentification platform identifies changes to the source records (e.g., the real records).

When the alias records are provided as part of a subscription model, a production data feed may be customized to the particular requirements of a user. For example, the user may include a new third party desiring to connect its element to the network. Envision that the third party has built a new application for processing a particular type of message within a particular geographic region where the network is located. Before an entity that manages the network (e.g., an owner organization) allows the third party to connect its new application, the entity may require that the third party test its new application to ensure that it will function appropriately. This may include ensuring proper data integration, interoperability with other systems, and the like. Testing with real-time actual production data is a good way for the third party to meet the entity's requirements. Thus, the third party may request to receive a production data feed that includes messages of the particular type for the particular geographic region. In some examples, the third party goes through an authorization process as part of the request. Like the evaluation system, a user interface may be presented to the third party (or other user) that includes one or more options for selecting characteristics of the production data that will be included in the production data feed. For example, a region, facility, source application, data type, data range, any other suitable characteristic for filtering the production data may be presented on the user interface. This also includes an option that the data be deidentified. Selection of any one of the options will function to filter the production data provided in the production data feed based on a dimension (e.g., a data attribute) that corresponds to the selected option. Once a production data feed request is generated, it may be fulfilled by the system. To do so, the system watches for messages flowing through the network and intercepts those messages that match the characteristics identified in the request. In the third party's example, these are messages of the particular type for the particular region. The system then routes at least a portion of the identified messages to the subscribing entity—in this example, to the third party. In most cases, the portion of the production data will be deidentified as described herein. In this manner, identifying information of the users is protected and the third party is still able to test its application using actual real-time production data. Other users include, for example, government entities, other operators within the network, research entities, and the like.

Figure 9:
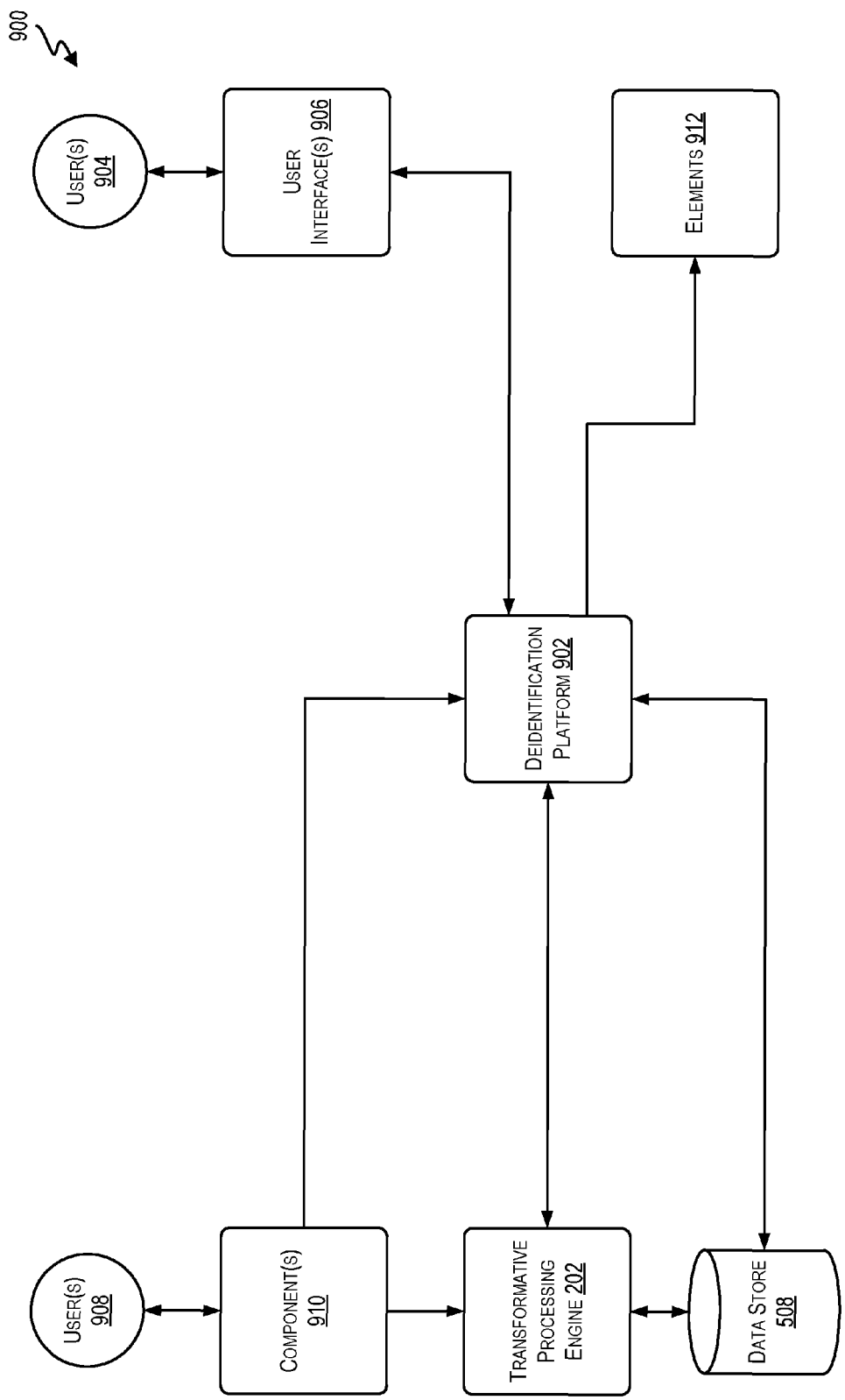
FIG. 9 is an example block diagram illustrating a network in which techniques relating to deidentification of production data as described herein, according to at least one example.

Turning now to FIG. 9, a network 900 is shown in accordance with an embodiment. The network 900 may be implemented using at least some of the elements of the network 800 and the other networks described herein. The network 900 includes a deidentification platform 902, which is configured to implement the techniques described herein. For example, the deidentification platform 902 retrieves data, which may be in the form of production data, from the transformative processing engine 202, directly from the components 910, and/or from the data store 508. The deidentification platform 902 may be disposed within the network 900 in a manner that it can identify data as it flows through the network 900. The data flows through the network 900 in the form of one or more messages that are processed by different elements of the network 900. In some examples, the messages are provided directly to the deidentification platform 902 (e.g., from the components 910). Such communications between the components 910 and the deidentification platform 902 may be within the receiving layer 302. In some examples, as described herein, the transformative processing engine 202 functions to integrate data from many different disparate sources within a network and make such data available for other features of the network. In this example, the transformative processing engine 202 may make certain data available to the deidentification platform 902. Such communications between the transformative processing engine 202 and the deidentification platform 902 may be within the aggregation layer 304. In some examples, the deidentification platform 902 may access data within the data store 508. Such communications between the data store 508 and the deidentification platform 902 may be within the active unified data layer 308. In some examples, in terms of real-time, the data from the components 910 may most closely approximate real-time, followed by the data from the transformative processing engine 202, and followed by the data store 508. In some examples, that data store 508 is accessed to retrieve historical production data.

Prior to being provided to the one or more users 904 via user interfaces 906 or to elements 912, the data may be processed by the deidentification platform 902. This includes, in some examples, removing identifying information from the data to ensure that the data cannot be used to identify the users (e.g., patients) to whom the data belongs. The one or more users 904 may interact with the deidentification platform 902 via the one or more user interfaces 906. In some examples, via a particular user interface 906, a particular user 904 provides a request to the deidentification platform 902 for production data. In some examples, the production data is provided back to the particular user 904 via the particular user interface 906, via another user interface 906, or in some other manner. The elements 912 are examples of elements of the network 900 that may receive production data as described herein. The elements 912 are also examples of elements located outside of the network 900 that can receive production data as described herein. For example, a particular element 912 is an application of a third party that desires to join its application to the network 900. A different element 912 is an application managed by an entity that operates the network 900 or hosted by the entity and which is already operational within the network 900. The deidentification platform 902 is therefore used to collect production data, process the production data (e.g., generate alias records), provide production data to particular users and elements, and test particular elements, all in an automated manner that has a low risk of disclosing identifying information.

Figure 10:
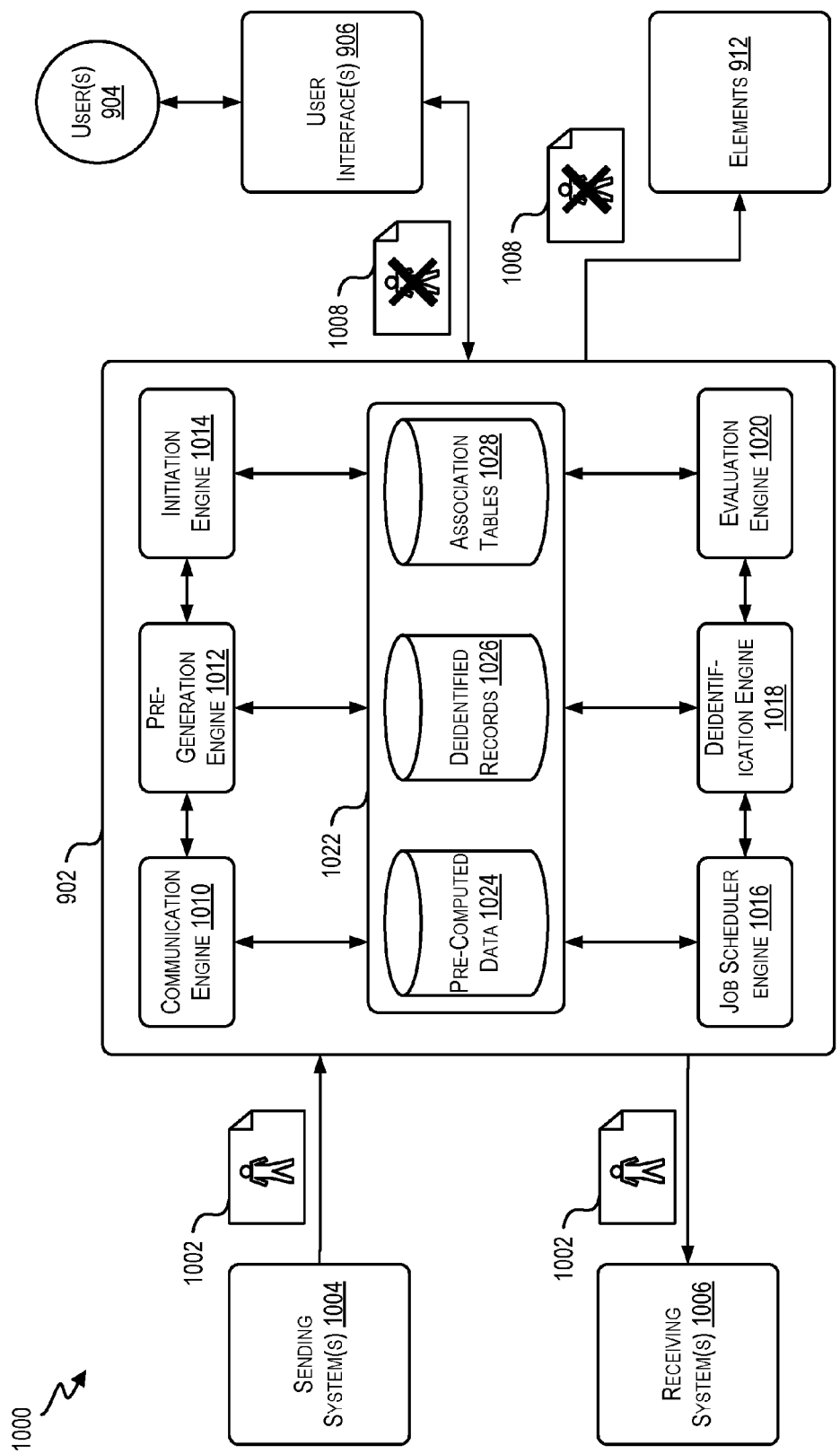
FIG. 10 is an example block diagram illustrating a network in which techniques relating to deidentification of production data as described herein, according to at least one example.

Turning now to FIG. 10, a network 1000 is shown in accordance with an embodiment. The network 1000 includes the deidentification platform 902 of FIG. 9 at a greater level of detail. At a high level, the deidentification platform 902 is configured to access, receive, or intercept messages 1002 from sending system 1004 as the messages 1002 are traveling to receiving systems 1006. The message 1002 is an example of production data generated by the sending system 1004. In a certain context, the message 1002 most likely identifies a particular dependent user and certain details about the user. For example, the message 1002 may be an ADT-A03 message identifying a user that is being released (e.g., discharged). In this example, the sending system 1004 is a terminal at facility that was used to release the user and which generated the message 1002. The receiving system 1006 can be a facility information system. If the message 1002 were an ADT-A01 message, the receiving system 1006 may be the same terminal, but the receiving system 1006 may be a different system of the facility. In any event, the message 1002 may therefore identify the user, why the message is being sent, and circumstances surrounding the user's release (e.g., outcome, follow-up instructions, condition being treated for, and any other suitable detail). Depending on how the message 1002 is processed (outside the scope of the current discussion), a portion of the message 1002 may be saved in connection with an electronic record of the user. This may be in addition to the receiving system 1006 receiving the message 1002. For example, the details of the discharge message can be persisted to the user's electronic record that is stored within the data store 508 or in some other location within the network. In some examples, the user may have more than one record dispersed among different networks, geographic divisions within the same provider network, and the like.

In some examples, the deidentification platform 902 retrieves certain messages 1002 for which a production data feed request has been submitted and provides portions of the messages 1002 to certain ones of the elements 912 and/or the users 904 as adjusted messages 1008. In some examples, the deidentification platform 902 tests certain of the elements 912 using the adjusted messages 1008 in accordance with a production data request. Whether testing the elements 912 or simply providing the adjusted messages 1008, the deidentification platform 902 is configured to generate the adjusted messages 1008 by at least adjusting portions of the adjusted messages 1008 by deidentifying, randomizing, and/or anonymizing, as described herein. In some examples, a particular adjusted message 1008 includes information from an alias record which is not capable of identifying a real user identified by a particular message 1002 provided by the sending system 1004. As the messages 1002 are processed by the deidentification platform 902, the adjusted messages 1008 are generated to include deidentified information.

In order to implement these and other functions, the deidentification platform 902 is configured to manage one or more sub-modules, components, engines, and/or services directed to examples disclosed herein. For example, the deidentification platform 902 includes a communication engine 1010, a pre-generation engine 1012, an initiation engine 1014, a job scheduler engine 1016, a deidentification engine 1018, and an evaluation engine 1020. While these engines are illustrated in FIG. 10 and will be described as performing discrete tasks with reference to the flow charts, it is understood that FIG. 10 illustrates example configurations and other configurations performing other tasks and/or similar tasks as those described herein may be implemented according to the techniques described herein. Each of the engines described in the deidentification platform 902 may be configured to access a data store 1022. The data store 1022 includes, for example, a pre-computed data database 1024, a deidentified records database 1026, and an association tables database 1028. In some examples, at least some of the databases in the data store 1022 are in memory databases. The pre-computed data database 1024 includes data that is pre-computed and accessed by the platform 902 at a time when a transaction is processed. The deidentified records database 1026 includes alias records that correspond to real records of real users. The association tables database 1028 includes one or more tables capable of identifying an association between alias records and real records of real users.

The communication engine 1010 is configured to enable communication with other elements of the networks described herein (e.g., the sending systems 1004, the receiving systems 1006, the user interfaces 906, the elements 912, etc.). Thus, the communication engine 1010 is configured to intercept messages that flow within the networks described herein and route those messages to the appropriate receiving systems. In some examples, this includes intercepting portions of the messages and/or receiving message identifiers for the messages. In some examples, the communication engine 1010 enables communications between others engines of the deidentification platform 902. In some examples, the communication engine 1010 is configured to parse the messages and identify the sending system 1004 from which the message originated. Based on the particular sending system 1004, the deidentification platform 902 may process the data within the message differently. For example, each sending system 1004 may be defined using a specific set of segments included in the messages generated by the sending system 1004. The segments define characteristics of the sending systems 1004 and, based on the segments, the deidentification platform 902 will determine which data fields of the messages generated by the sending system 1004 are relevant for deidentification purposes. For example, a segment is a group of fields each of which conforms to a particular data type. Fields can have a simple or complex structure. They consist of components according to the rules defined in their data-type definition. In order to support more complex data types, some components may consist of subcomponents. In some examples, a whitelist of segments is maintained. If a segment is on the whitelist it can be adjusted and persisted in the alias record. Segments that are not on the whitelist, however, will not be processed at all. In some examples, a blacklist of segments is maintained. If a segment is found on the blacklist it will not be adjusted or persisted to the alias record. In some examples, the concept of whitelists and blacklists can be applied at the term level. This may enable free text sections of messages to be persisted to alias records without concern of disclosing certain restricted information associated with the user.

In some examples, certain segments may be combined with other message processing in order to achieve the desired results. For example, an object may be built from an actual message, and certain segments may be run through a whitelist filter. In this manner, only certain portions of the message object may be removed from the message, instead of the entirety of the segment. For example, if any occurrences of the certain values are found, then only those values may be removed from the message and/or replaced with asterisks.

The pre-generation engine 1012 is configured to generate certain data sets that are used by other engines of the deidentification platform 902 during automated testing, deidentification of records, and the like. For example, the pre-generation engine 1012 may include a name builder module that is configured to generate tables including given names, surnames, and/or middle names. In some examples, at least one table is provided for given names and at least one separate table is provided for surnames. The tables are populated from lists of given names and surnames (e.g., a list including the top 500 boy names for last 50 years, a list of biblical names, and any other suitable list). In some examples, the tables of names including given names are organized based on gender and saved in the pre-computed data database 1024. The tables of surnames are also saved in the pre-computed data database 1024. The tables of names may then be accessed by other engines of the deidentification platform 902 as part of generating alias records and deidentifying data. For example, an alias record may be generated that includes an alias given name and an alias surname generated by the pre-generation engine 1012 and saved in the pre-computed data database 1024. In some examples, the pre-generation engine 1012 is configured to update the tables of given names and tables of surnames based on real production data. For example, when a new name is encountered in production data that is not already within the tables, the new name may be added to the tables and used as an alias name for other users.

Other types of data are also generated by the pre-generation engine 1012. For example, the pre-generation engine 1012 may also include an address builder module that is configured to generate tables of addresses. In some examples, the tables of addresses, like the names discussed above, are generated based on real addresses. The table of addresses is therefore seeded with street names and street directions. The tables of addresses are then saved within the pre-computed data database 1024. In some examples, other engines of the deidentification platform 902 access the tables of addresses as part of generating alias records. In particular, as part of generating alias addresses for alias records. In some examples, other types of data (e.g., alias government identifiers and account numbers) are also generated by the pre-generation engine 1012.

The initiation engine 1014 is configured to receive input from one or more users of the deidentification platform 902 in order to generate production data requests. For example, the initiation engine 1014 receives selection of one or more options representing distinct data dimensions (e.g., data attributes) to be included in a particular production data request. These options include, for example, care provider division, geographic location with respect to a market, facility, source application, data type, date range, whether production data is to include identifying information, and any other suitable options. Once the options have been selected, either directly from a user via a user interface or programmatically, the initiation engine 1014 generates a production data request. The production data request may then be provided to the job scheduler engine 1016 and/or a database associated with the job scheduler engine 1016 for later execution. In some examples, the options are determined programmatically based on characteristics of the requesting user and/or a work flow in which the requesting user is working. An example workflow corresponds to the process of connecting a new third party-provided application to the network. The workflow may require that an entity responsible for the application (e.g., the third party) perform certain steps prior to being connected. For example, the steps may include submitting formal documentation for how the application will function, signing certain documents (e.g., contracts for use, intellectual property agreements, use of data agreements, and the like), performing certain minor tests, and any other suitable step. Once any one or more of these (or other) steps have been performed, the initiation engine 1014 may automatically receive a notification that the entity is ready to test the application using actual real-time production data. The initiation engine 1014 may access characteristics of the application to determine which data dimensions the entity will likely want to use to test the application. The determined dimensions will then be used to generate the production data request. Along the way, the entity may also provide input to help identify the most relevant data dimensions.

The initiation engine 1014 is also configured to receive and process request for feeds of production data to subscribed users. The subscribed users may use the production data for testing purposes or for any other suitable purpose. In this manner, the initiation engine 1014 is configured to manage subscriptions for production data. The subscriptions are initiated by the initiation engine 1014 receiving requests for feeds of production data, determining what data to include in the feeds, and generating production data feed requests that may be processed by other engines of the deidentification platform 902.

The job scheduler engine 1016 is configured to manage a job schedule that includes one or more jobs relating to techniques for automated testing and management of production data. In particular, the job schedule may include jobs such as production data requests or production data feed requests. The requests may be received from one or more internal or external users of the network 1000, as described herein. The production data requests are processed by the job scheduler engine 1016 in order to determine whether the production data requests require performance of a job. If so, the job scheduler engine 1016 adds the production data requests to the job schedule as one or more jobs. The job scheduler engine 1016 then periodically scans its job schedule to determine whether a job should be executed. The job scheduler engine 1016 may also scan its job schedule according to some other schedule (e.g., based on an event). In some examples, once the job scheduler engine 1016 determines that a particular job should be executed, the job scheduler engine 1016 notifies the appropriate engine to execute the job. In some examples, this includes notifying the evaluation engine 1020 to execute a test of production data using data collected according to a production data request, or notifying the communication engine 1010 to provide data to a subscribed entity.

The deidentification engine 1018 is configured to generate alias records that correspond to real records of actual users. The alias records are generated on a transactional basis. For example, an alias record is generated for a particular user when the deidentification platform 902 first receives a message that identifies the user (if an alias record for the user does not already exist). The alias record is stored in the deidentified records database 1026 and updated whenever the deidentification platform 902 receives another message that identifies the user. The deidentification engine 1018 deidentifies data according to one or more processing rules that correspond to segments of the sending systems 1004.

For example, the processing rules for a particular sending system 1004 may indicate that certain segments of a message from the sending system 1004 should be deidentified while other segments can be ignored. The other segments may include data that is not capable of identifying the user and thus is ignored. In some examples, certain processing rules are generic for all sending systems that include similar segments, while other processing rules are particular for particular sending systems.

As part of generating the alias record, the deidentification engine 1018 receives the message and identifies which data from the message should be replaced with deidentified data in the alias record. This includes, for example, identifying data that should be replaced with data from the pre-computed data database 1024, data that should be anonymized, data that should be randomized, data that should be redacted, and any other alteration that can be made to the data. Identifying the data may also include identifying which data fields include the data to be altered. Once the fields are identified, the deidentification engine 1018 proceeds to process the data and output the alias record. The alias record may be stored within the deidentified records database 1026. As part of generating and storing the alias record, the deidentification engine 1018 identifies, from attributes of the message, an association between the actual user and the alias record. This association, which may be a single unique identifier or a combination of pieces of data, is retained in the association tables database 1028 and may include a designation of the facility from which the message originated, a designation of the application from which the message originated, a designation of the source system, a designation of a gender of the user, a designation of an account number associated with the user or any other suitable designator. In some examples, facility, application, and account number are the only items of information from the transaction including the message that are used to associate the message, which identifies the actual user, with the alias record.

Figure 11:
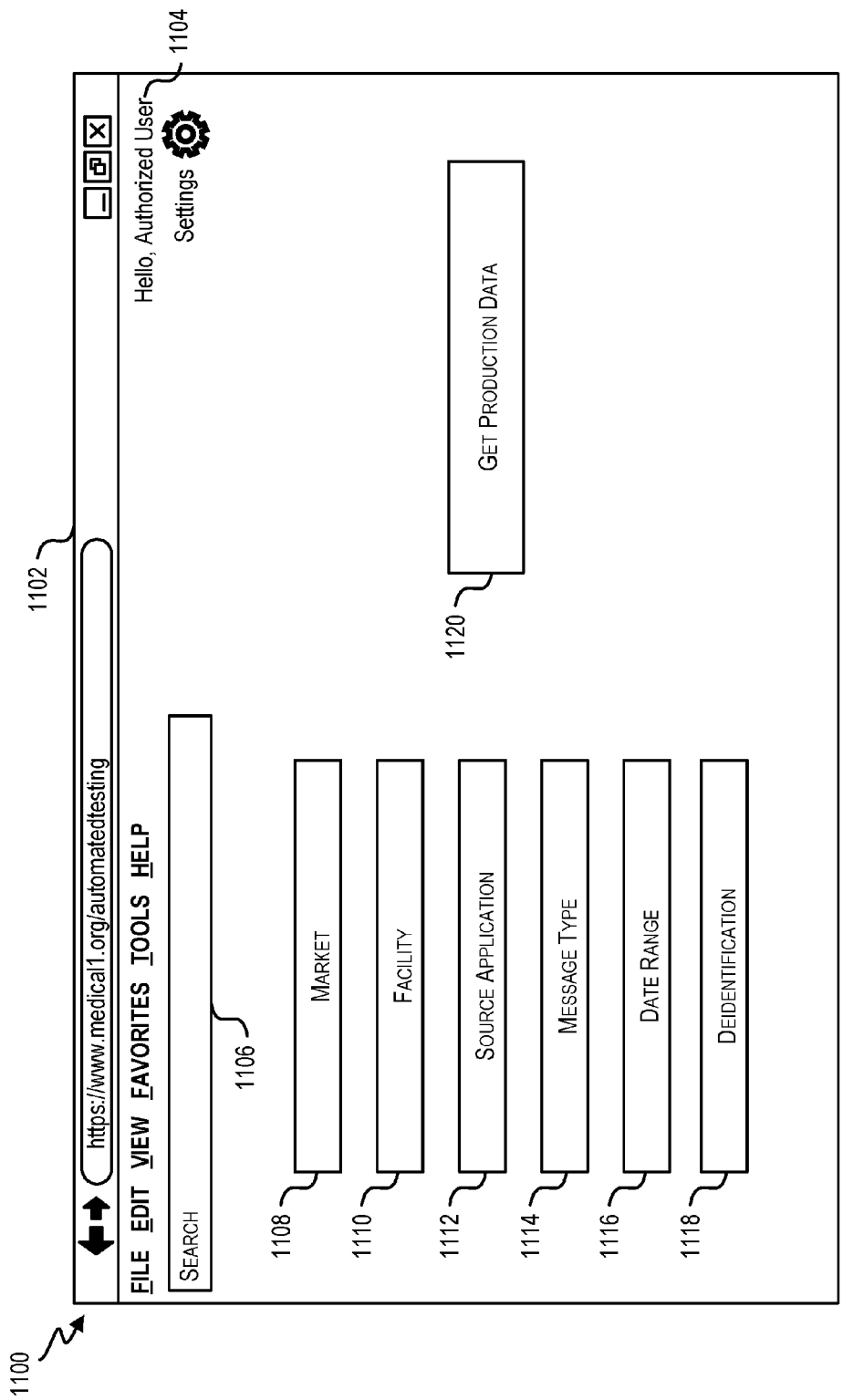
FIG. 11 is an example user interface by which requests for deidentified production data may be processed as described herein, according to at least one example.

Turning now to FIG. 11, a production data management user interface 1100 is shown in accordance with an embodiment. The production data management user interface 1100 is an example of the one of the user interfaces 906. Thus, in this example, one or more users interact with the deidentification platform 902 via the production data management user interface 1100. In some examples, the production data management user interface 1100 may be presented on one or more user devices via a webpage 1102 (e.g., a webpage that is capable of being rendered by a web browser), as a desktop application, or in any other suitable manner. The webpage 1102 identifies an Authorized User 1104 that has signed into an account associated with the webpage 1102. In this example, the Authorized User 1104 may be an internal user (e.g., an employee of the entity that hosts the network as described herein). In some examples, the Authorized User 1104 may be an external user (e.g., a third party, government entity, research entity, or other comparable user). In any event, the Authorized User 1104 may submit to verification of their identity prior to accessing the webpage 1102. In some examples, depending on the identity of the Authorized User 1104, the functionality associated with the webpage 1102 may vary. For example, for an internal user, the webpage 1102 may include options for scheduling a test of an element of a network using production data. For an external user, the webpage 1102 may include options for scheduling delivery of production data via a production data feed. In some examples, the Authorized User 1104 is authorized to access the webpage 1102 after it is verified that the Authorized User 1104 is associated with at least one project relating to testing.

The webpage 1102 includes a search bar 1106 for searching within a network, the Internet, any other network, or within a database, data structure, or the like. In some examples, by using the search bar 1106, the Authorized User 1104 accesses different options for filtering production data other than those include in the webpage 1102. As illustrated in FIG. 11, the webpage 1102 includes production data options 1108-1118. In some examples, the production data options 1108-1118 are presented to the Authorized User 1104 and, depending on which are selected by the Authorized User 1104, used when providing production data and/or testing elements. For example, the production data options 1108-1118 include a market option 1108, a facility option 1110, a source application option 1112, and a message type option 1114. In some examples, selection of one of the options 1108-1114 reveals a list of items. For example, selection of the market option 1108 reveals a list of available markets according to which the production data can be filtered. Similarly, selection of facility option 1110 reveals one or more facilities according to which the production data can be filtered. The same can be said for the options 1112 and 1114. Thus, the production data options 1108-1114 function as filters to narrow down the production data based on data dimensions that correspond to the options 1108-1114 (e.g., market dimension, facility dimension, source application dimension, and message type dimension).

The production data options 1108-1118 also include a date range option 1116 and a deidentification option 1118. By selecting the data range option 1116, the Authorized User 1104 is enabled to identify a particular date range of production data that they desire. For example, selection of the date range option 1116 causes a calendar to be presented and the Authorized User 1104 selects a range within the calendar. In some examples, the date range also corresponds to a period of how long the production data will be provided to the Authorized User 1104 and/or how long the production data will be used to test an element of the network. By selecting the deidentification option 1118, the Authorized User 1104 is presented with a prompt of whether the production data should be deidentified as described herein. In some examples, deidentification option 1118 is not presented because all production data that is output is based on alias records and therefore deidentified. In some examples, depending on the element which produces the production data or on the element which is to receive the production data, all of the output production data will be deidentified. A whitelist or blacklist of elements may be maintained and accessed to determine whether the data should be deidentified.

Once the Authorized User 1104 has selected the appropriate options from the production data options 1108-1118, the Authorized User 1104 requests the production data using a get production data button 1120. In some examples, in response to selection of the button 1120, the deidentification platform 902 generates a production data request, a production data feed request, or any comparable request for production data. In some examples, the deidentification platform 902 then fulfills the request in accordance with techniques described herein. This includes, for example, testing an element of the network, providing end-to-end tracking of messages, providing playback of messages, providing auditing of elements of the network, providing results of testing, outputting production data to third parties and other third parties, and any other comparable action that uses production data.

FIGS. 1200, 1300, 1400, 1500, 1600, 1700, and 1800 illustrate example flow diagrams showing process 1200, process 1300, sub-process 1400, process 1500, process 1600, process 1700, and process 1800 as described herein. Process 1200, process 1300, sub-process 1400, process 1500, process 1600, process 1700, and process 1800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes or sub-processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 12:
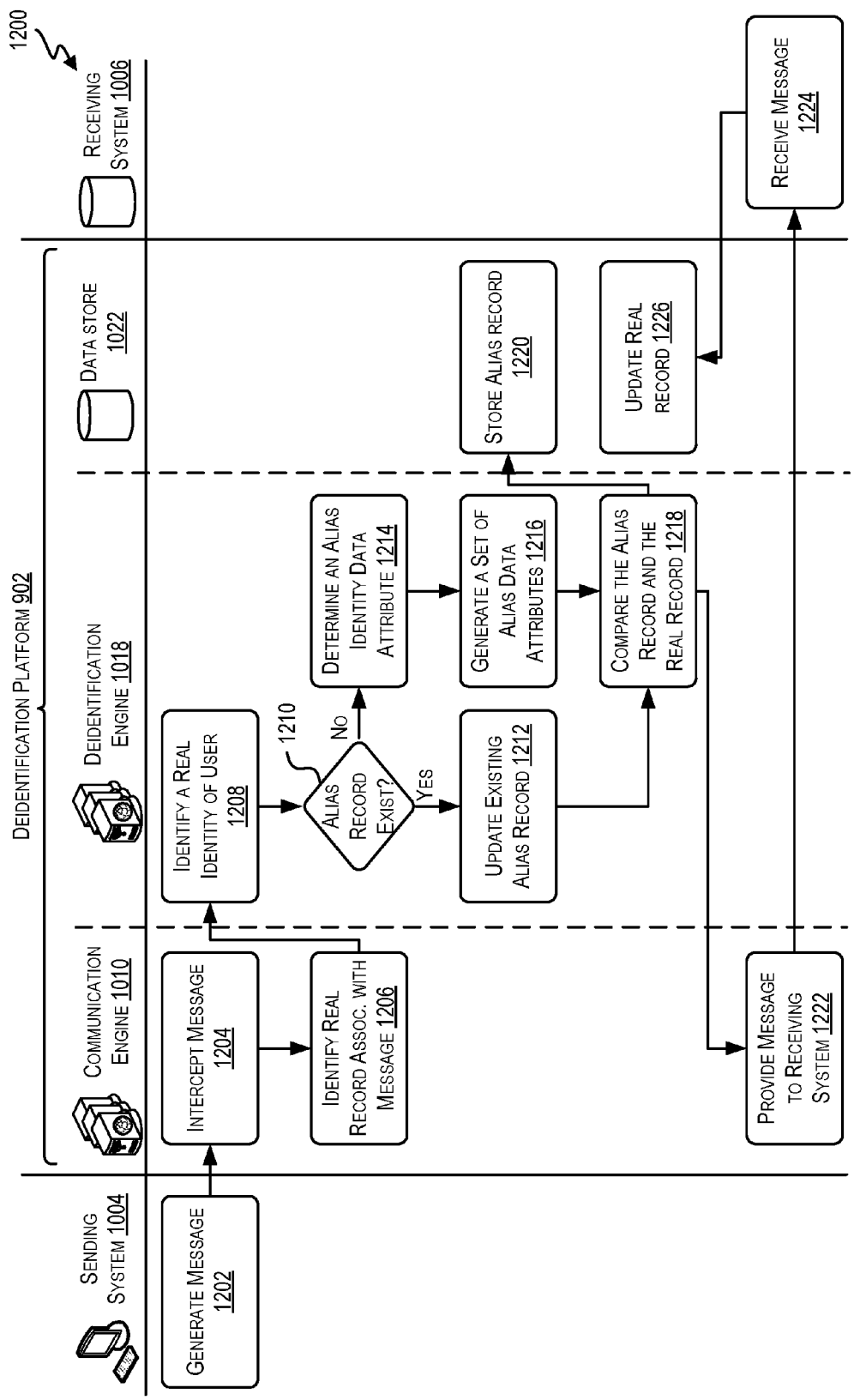
FIG. 12 is a flow diagram depicting example acts for implementing techniques relating to generating deidentified production data as described herein, according to at least one example.

FIG. 12 depicts the process 1200 including example acts or techniques relating to generating deidentified production data, in accordance with at least one embodiment. The deidentification platform 902 (FIG. 9), the sending system 1004 (FIG. 10), and the receiving system 1006 (FIG. 10) may perform the process 1200 of FIG. 12. The process 1200 begins at 1202 by generating a message. In some examples, this is performed by the sending system 1004. In some examples, the message may include segments of production data corresponding to a record of a user. Thus, the message may be any conventional message that identifies the user and includes information corresponding to the record of the user. For example, the message may be any suitable version of an HL7 message. As describe herein, the sending system 1004 may be any suitable component capable of generating, routing, or otherwise processing the message. In some examples, messages are generated at the sending system 1004 in response to certain events and/or transactions. For example, an example of an event is a new user being admitted to a facility. Other events include release of a user, transfer of a user, orders for a user, referrals of a user, results for a user, and any other suitable event relating to the user. In some examples, the message identifies the user and aspects of the user's electronic record.

At 1204, the process 1200 intercepts the message. In some examples, this is performed by the communication engine 1010 (FIG. 10). Intercepting the message includes receiving the message from the sending system 1004 that is sending the message to a destination other than the communication engine 1010. For example, while the message may be directed to a particular receiving system (e.g., the receiving system 1006), it may nevertheless be intercepted by the communication engine 1010 while on its way to the receiving system 1006. In this manner, the process 1200 may function to generate deidentified production data on a transaction-by-transaction basis. In some examples, the process 1200 may generate deidentified production data, or at least alias records, in a manner that is not dependent on transactions. For example, the process 1200 may be configured to access a database of real records corresponding to real users and use the real records to generate corresponding alias records as described herein.

At 1206, the process 1200 identifies a real record associated with the message. In some examples, this is performed by the communication engine 1010. Identifying the real record associated with the message includes determining that the message includes information that identifies a record also found in a database of real records. Identifying the real record associated with the message may include parsing segments of the message to identify a record identifier or other identifying information that indicates that the message is associated with the user. In some examples, certain messages may be intercepted by the communication engine 1010 that do not identify real records. These messages may be ignored or otherwise allowed to pass through without the deidentification platform 902 performing additional processing. In some examples, the communication engine 1010 is configured to only intercept messages that identify real records of users. In this example, the communication engine 1010 functions according to a subscription model and is forwarded those messages that have characteristics that fulfill a set of subscription conditions. For example, a set of subscription conditions may request all messages for a particular region (e.g., southeastern United States), for a particular class of users (e.g., users with a particular condition), for a particular gender of users (e.g., female), for a particular type of message (e.g., discharge, transfer, order, etc.) etc. In some examples, the set of subscription conditions request all messages that indicate particular changes to real records. For example, if a change to a particular real record does not exceed some conditional threshold, a message that identifies the particular real record may not be intercepted by the communication engine 1010.

At 1208, the process 1200 identifies a real identity of the user. In some examples, this is performed by the deidentification engine 1018 (FIG. 10). Identifying the real identity of the user may be based on identifying information from the message. In some examples, the deidentification engine 1018 compares a name (e.g., a first name and a last name) of the user or other identifier of the user (e.g., an organizational identifier) in the message with a table of known users and/or known identifiers. The table of known users and/or known identifiers may be hosted by the same organization that hosts the deidentification platform 902. In some examples, the deidentification engine 1018 may be implemented to deidentify production data that is generated by a third-party system. In this example, the table of know users and/or known identifiers may be hosted by the third-party system and shared with the entity that hosts the deidentification platform 902. Identifying the real identity of the user may also reveal a real record of the user. For example, if the system includes access to the real identity of the user, it likely also has access the real record of the user.

At 1210, the process 1200 determines whether an alias record exists for the user identified at 1208. In some examples, this is performed by the deidentification engine 1018. Determining whether the alias record exists includes determining whether an alias association for the user has been generated and whether, based on the alias association, whether an alias record for the user has been generated. In some examples, the alias record is an electronic record that mirrors the real electronic record of the user, but includes data that has been deidentified, randomized, and/or anonymized compared to the real record. In some examples, more than one alias record may be associated with a particular real record. This set of alias records may include some shared characteristics with each other, but may also include characteristics that are unique. In some examples, determining whether an alias record exists includes accessing a database that includes alias records and/or identifiers of alias records that have been generated.

If an alias record does exist (e.g., the answer at 1210 is YES), then at 1212, the process 1200 updates an existing alias record. In some examples, this is performed by the deidentification engine 1018. The existing alias record may have been generated previously as part of an earlier transaction or in response to some other event. Updating the alias record may include making any suitable adjustment to alias data attributes to correspond to real record data attributes of the real record. These adjustments can include adding new fields to the alias record that describe updated present conditions of the user, updated information relating to the user, and the like. In some examples, updating the existing alias record includes saving a portion of the message to the alias record. Saving the portion of the message to the alias record includes updating the alias record with the portion of the message that affects the alias record. For example, if the message indicates that a discharge transaction has been processed for the user, the alias record is updated to reflect the details of the discharge. In some examples, saving the portion includes saving the portion in an alias record database that includes other alias records for other users. In some examples, an alias association is used to identify which alias record(s) is/are associated with the real record of the user.

If an alias record does not exist (e.g., the answer at 1210 is NO), then at 1214, the process 1200 determines an alias identity data attribute. In some examples, this is performed by the deidentification engine 1018. The alias identity data attribute includes an alias given name, an alias surname, and/or any other suitable combination of the foregoing. In some examples, the alias identity data attribute corresponds to the real identity of the user. For example, if the real identity of the user indicates that the user is male, the alias identity data attribute includes an alias given name selected from a set of male given names. The set of alias given names may be stored in the pre-computed data database 1024 or other comparable structure. In some examples, determining the alias identity data attribute includes opening a new record and determining the alias identity data attribute by which the new record will be known.

At 1216, the process 1200 generates a set of alias data attributes. In some examples, this is performed by the deidentification engine 1018. Generating a set of alias data attributes includes identifying a set of real data attributes in the real record and adjusting information in the set of real data attributes to create the set of alias data attributes. Adjusting the information includes randomizing, deidentifying, and/or anonymizing. In some examples, generating the set of alias data attributes includes creating a set of alias fields corresponding to a set of real fields, populating the set of alias fields with alias information, and saving the set of alias fields in connection with the alias identity data attribute. The set of alias data attributes (e.g., fields) are generated in a manner that makes identifying the real identity of the user virtually impossible. At the same time, however, the set of alias data attributes are generated in a manner that ensures that they correspond to those of the real user. For example, evaluation by a professional user of the real record and the alias record would result in the same or similar conclusions, even though the two records are entirely distinct.

At 1218, the process 1200 compares the alias record and the real record. In some examples, this is performed by the deidentification engine 1018. Comparing the alias record and the real record can includes comparing a subset of the set of alias data attributes and a subset of the set of real data attributes. This comparison can be helpful to determine whether any of the alias data attributes inadvertently correspond directly to any of the real data attributes. Because this correspondence may enable a nefarious or other user to identify the real user using the alias record, it may be desirable to ensure that the alias data attributes are not too similar to the real data attributes. In some examples, comparing includes parsing the alias record to identify any user identifying information from the real record. If such identifying information is identified, the process 1200 is configured to remove the identifying information (e.g., place asterisks through the text or otherwise adjust the text) or determine an updated alias data attribute to replace the offending data attribute.

At 1220, the process 1200 stores the alias record. In some examples, storing the alias record includes storing the alias record in the data store 1022 (FIG. 10). The alias record is stored in a manner that enables efficient retrieval when the alias record is requested by the alias identity data attribute and/or as having alias data attributes that correspond to a set of requested data attributes.

At 1222, the process 1200 provides the message to a receiving system. In some examples, this is performed by the communication engine 1010. Providing the message includes allowing the message to continue on to its originally destination (e.g., the receiving system 1006). The deidentification platform 902 may include routing logic to route the message to the receiving system 1006. In some examples, providing the message to the receiving system includes tracking the message as it is transferred between the sending system and the receiving system. In this manner, the deidentification platform 902 may provide end-to-end tracking of transactions that it encounters.

At 1224, the process 1200 receives the message. In some examples, this is performed by the receiving system 1006 (FIG. 10). Receiving the message includes the message being delivered to the receiving system 1006.

At 1226, the process 1200 updates the real record. In some examples, update the real record includes storing the real record in the data store 1022. Updating the real record includes persisting changes to the real record that are reflected in the message. For example, if the message related to an update to a certain data field in the real record, then at 1226 the real certain data filed would be updated and stored in the data store 1022.

Figure 13:
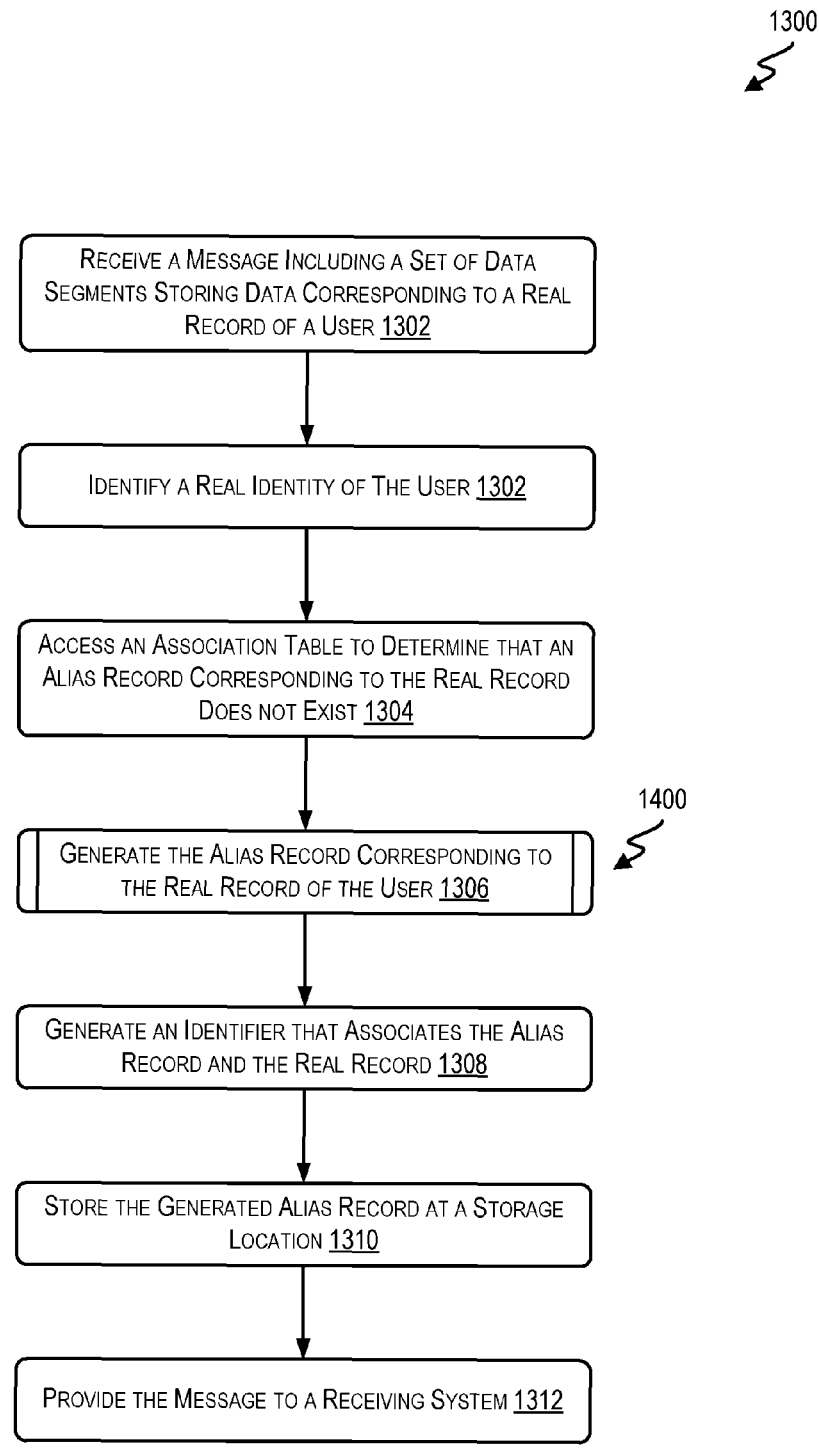
FIG. 13 is a flow diagram depicting example acts for implementing techniques relating to generating deidentified production data as described herein, according to at least one example.

FIG. 13 depicts the process 1300 including example acts or techniques relating to generating deidentified production data, in accordance with at least one embodiment. The deidentification platform 902 (FIG. 9) may perform the process 1300 of FIG. 13. The process 1300 begins at 1302 by receiving a message including a set of data segments storing data corresponding to a real record of a user. In some examples, this is performed by the communication engine 1010 (FIG. 10). Receiving the message includes receiving the message from a sending system within a network. The message may have been generated in response to an event associated with the user and/or the real record of the user. For example, the event may be associated with a change to the real record made by a professional user using a user device. In some examples, the event is generated by a specialized component (e.g., a machine or device used in the treatment of the user). In some examples, the message includes a generated message generated by a component and intercepted by the communication engine 1010 (FIG. 10), an transformative message generated by the transformative processing engine 202 (FIG. 2) and retrieved from the transformative processing engine 202 by the communication engine 1010, or a record message stored in a database of the data store and retrieved by the communication engine 1010 from the database.

At 1302, the process 1300 identifies a real identity of the user. In some examples, this is performed by the deidentification engine 1018 (FIG. 10). Identifying the real identity of user can be based on the message. The real identity of the user can include a first real name of the user and a second real name of the user.

At 1304, the process 1300 accesses an association table to determine that an alias record corresponding to the real record does not exist. In some examples, this is performed by the deidentification engine 1018. Accessing the association table can be based on the real identity of the user. For example, the real identity of the user may be used to access the association table. In some examples, the association table includes an identifier that identifies an association between the alias record and the real record. The association table can include other identifiers each associating a respective alias record with a respective real record.

At 1306, the process 1300 conducts the sub-process 1400 that includes generating the alias record corresponding to the real record of the user. The sub-process 1400 is described in more detail herein with reference to FIG. 14.

At 1308, the process 1300 generates an identifier that associates the alias record and the real record. In some examples, this is performed by the deidentification engine 1018. As introduced above, the identifier identifies an association between the alias record and the real record. In some examples, the identifier can include a unique alphanumeric identifier or a unique association of a facility identifier that identifies a facility from which the message originated, an application identifier that identifies an application from which the message originated, and an entity identifier that uniquely identifies an association between the user and an entity where the message originated (e.g., an account number of the user). The identifier may be stored as the only piece of information for associating the real record with the alias record. In some examples, the association table where the identifier is stored may be encrypted, along with communications that enter and leave the association table. The identifier is used by the sub-process 1400 to persist other changes the alias record when changes to the real record are identified.

At 1310, the process 1300 stores the generated alias record at a storage location. In some examples, this is performed by the deidentification engine 1018. Storing the alias record can include storing the alias record in at the storage location that is separate from the real record. For example, all real records may be stored in a first data store and all alias records may be stored in a second data store.

At 1312, the process 1300 provides the message to a receiving system. In some examples, this is performed by the communication engine 1010. Providing the message includes enabling delivery of the message to the receiving system.

Figure 14:
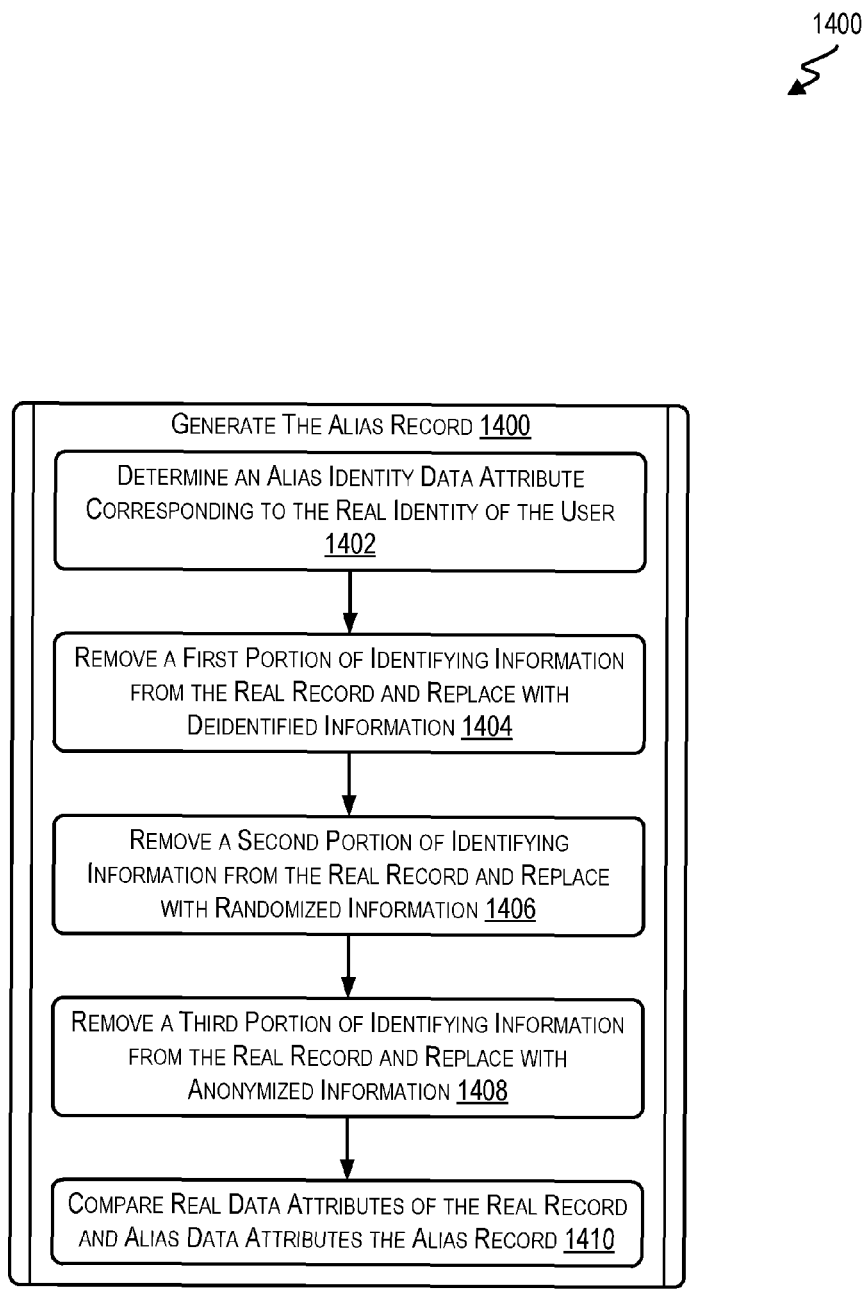
FIG. 14 is a flow diagram depicting example acts for implementing techniques relating to generating deidentified production data as described herein, according to at least one example.

FIG. 14 depicts the sub-process 1400 including example acts or techniques relating to generating an alias record in accordance with at least one embodiment. The deidentification engine 1018 (FIG. 10) of the deidentification platform 902 (FIG. 9) may perform the sub-process 1400 of FIG. 14. The sub-process 1400 begins at 1402 by determining an alias identity data attribute corresponding to the real identity of the user. The alias identity data attributes may include a first name, a second name, and/or a combination of the foregoing that correspond to a first name of the user and/or a second name of the user.

At 1404, the process 1400 adjusts a set of real data attributes belonging to the real record to generate a set of alias data attributes by removing a first portion of identifying information from the real record and replacing the first portion with deidentified information. In some examples, the first portion of identifying information is information found within the message that is capable of identifying the user. The deidentified information includes information which has been stripped of identifying information of the user such that it is not capable of identifying the user. In some examples, the deidentified information is generated dynamically and in response to receiving the message. In some examples, at least a portion of the deidentified information is pre-generated in accordance with techniques described herein. In some examples, generating the set of alias data attributes includes deidentifying a real first name and a real second name of the user to generate an alias first name and an alias second name that are distinct from the real first and the real second name, deidentifying a real organizational identifier of the user to generate an alias organizational identifier (e.g., an account number) that is distinct from the real organizational identifier, deidentifying a real nine-character identifier of the user to generate an alias nine-character identifier that is distinct from the real nine-character identifier, and/or deidentifying a real geographic locator of the user (e.g., a real address) to generate an alias geographic locator (e.g., an alias address) that is distinct from the real geographic locator. The deidentified information is saved in connection with the alias record as discussed with reference to 1310.

At 1406, the sub-process 1400 adjusts the set of real data attributes belonging to the real record to generate the set of alias data attributes by removing a second portion of identifying information from the real record and replacing the second portion with randomized information. In some examples, the second portion of identifying information is similar to the first portion of identifying information, but is treated differently because it includes data that is relevant, clinically or otherwise. For example, the second portion of identifying information is capable of identifying the user, but also identifies certain details about the user that may be shared by other users and may be relevant to the real record. In some examples, generating the set of alias data attributes includes randomizing a real contact number of the user to generate an alias contact number that is distinct from the real contact number. The alias contact number can share a three-character code with the real contact number. Generating also includes randomizing a real birth identifier of the user to generate an alias birth identifier that is distinct from the real birth identifier. The alias birth identifier can share a birth year with the real birth identifier. Generating also includes randomizing a real coverage identifier of the user to generate an alias coverage identifier that is distinct from the real coverage identifier. In some examples, the second information includes the real contact number of the user, a provider of the user, the birth identifier of the user, a next of kin of the user, and a guarantor of the user. In some examples, the three-digit code of the contact number may correspond to a geographic region in which the user lives. Similarly, the location identifier may also identify the geographic region with increased specificity. The real birth identifier identifies an age of the user. In some examples, the randomized information is generated dynamically and in response to receiving the message. In some examples, at least a portion of the randomized information is pre-generated in accordance with techniques described herein. The randomized information is saved in connection with the alias record as discussed with reference to 1310.

At 1408, the sub-process 1400 adjusts the set of real data attributes belonging to the real record to generate the set of alias data attributes by removing a third portion of the identifying information and replacing the third portion with anonymized information. In some examples, the third portion of identifying information is similar to the first and second portions, but is treated differently because the anonymized information is generated in a different manner. For example, the anonymized information is real production data that has been randomly selected and used to replace the third portion of the identifying information. The third portion of the identifying information includes information such as a name of an authorized user (e.g., a treating physician) and support entity identifier (e.g., insurance provider). Each of which is replaced with another real authorized user and/or a real support entity provided, but is compared against the actual authorized user and actual support entity to ensure that they are not the same. In some examples, the type of authorized users is selected to be the same (e.g., a first cardiologist is replaced with a second cardiologist). In some examples, generating the set of alias data attributes includes anonymizing a real support entity identifier of the user to generate an alias support entity identifier that is distinct from the real support entity identifier and/or a real authorized user identifier associated with treatment of the user to generate an alias authorized user identifier that is distinct from the real authorized user identifier. The anonymized information is saved in connection with the alias record as discussed with reference to 1310. In some examples, whether the first portion, second portion, third portion, or other portion, the sub-process 1400 is configured to remove data within free fields and replace it with certain other data. For example, the free data fields may include notes fields and/or free text fields. Instead of replacing these in alias record, they can be crossed out entirely or certain portions of identifying information may be removed. This can be based on accessing white lists that include words approved for inclusion in the alias records. This can also be based on accessing black lists that include words unapproved for inclusion in the alias records. The words on the black lists may be removed or edited. In some examples, if the word appears in a sentence or paragraph, then that sentence or paragraph is removed or edited.

At 1410, the sub-process 1400 compares real data attributes of the real record and alias data attributes of the alias record. In some examples, the real data attributes may include first information that is different from second information included in the alias data attributes. This comparison may go field to field through the two records. In some examples, this comparison is performed only on those fields that were updating as part of generating and/or updating the alias record.

Figure 15:
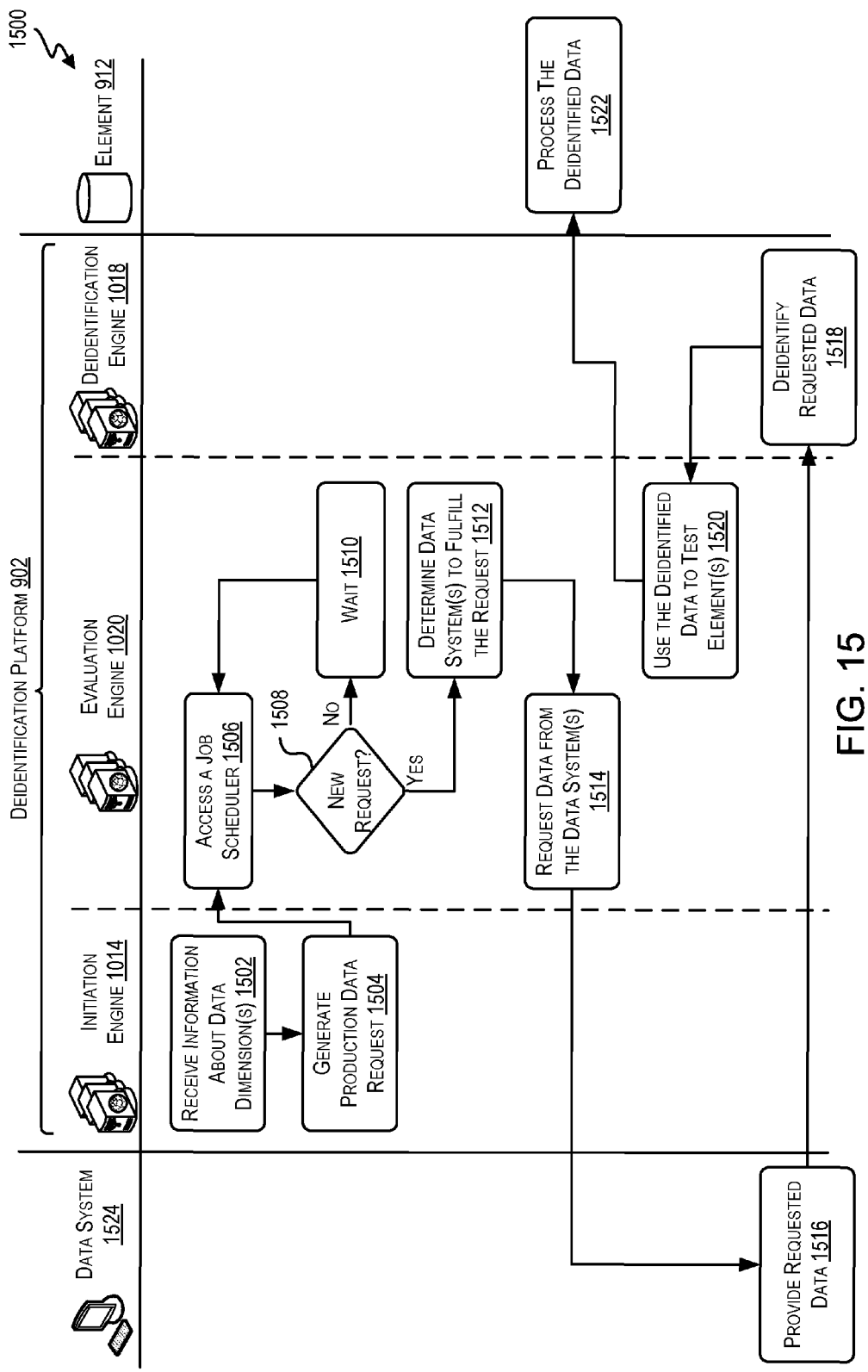
FIG. 15 is a flow diagram depicting example acts for implementing techniques relating to testing network elements using deidentified production data as described herein, according to at least one example.

FIG. 15 depicts the process 1500 including example acts or techniques relating to using deidentified production data to evaluate elements of a computer network, in accordance with at least one embodiment. The deidentification platform 902 (FIG. 9), a data system 1524 (FIG. 15), and the element 912 (FIG. 9) may perform the process 1500. The process 1500 begins at 1502 by receiving information about data dimension(s). In some examples, this is performed by the initiation engine 1014 (FIG. 10). The information about the data dimensions may be received in response to presenting one or more data dimension on a user interface of a user device. The data dimensions may correspond to characteristics of requested production data. In some examples, the data dimensions correspond to one or more selectable options for configuring a production data evaluation and/or production data request. In some examples, the user interface is presented as a web-based form for establishing an evaluation of one or more elements of a network. In some examples, the data dimensions, once selected, operate to filter the production data. In some examples, the user interface is an Application Programming Interface which enables external users and internal users to access the production data and evaluation capabilities of the deidentification platform 902.

At 1504, the process 1500 generates a production data request. In some examples, this is performed by the initiation engine 1014. In some examples, the production data request is generated in response to the information received at 1502. For example, the information may identify at least one data dimension that is selected from a set of data dimensions. In some examples, the process 1500 also receives a selection of a deidentification option that indicates that the data be deidentified. In some examples, a user device from which the selection is received or a user of the user device is compared to one or more whitelists to determine whether the data should be deidentified. For example, if the user device is a not a recognized user device, the data may be deidentified. Generating the production data request includes identifying characteristics of production data that are being requested. The production data request includes the at least one data dimension and a date range for which the production data are requested. The production data may include one or more transactions including record data. In some examples, the production data request is a request that can be used to retrieve production data from one or more sending systems and which uses the retrieved production data for one or more purposes (e.g., to evaluate an element of a network). The production data request includes a request to retrieve the production data based on the at least one data dimension that was selected. In this manner, the production data request may request that a subset of the production data be provided. In some examples, the subset of production data may correspond to data within a region, data of a particular data type, data for a particular application, data referencing a certain outcome (e.g., death, discharge, etc.), data referencing a particular authorized user, data referencing a particular condition, data for a particular user, data for users having a particular birth date (e.g., all users born in 1978 or all users born on Tuesdays in 1978), data for all users admitted during a particular time period, any other suitable distinction, all of which, none of which, or some of which can be deidentified as described herein.

At 1506, the process 1500 accesses a job scheduler. In some examples, this is performed by the evaluation engine

1020. The job scheduler is configured to manage the execution of one or more jobs. In some examples, the production data request corresponds to one of the one or more jobs. The job scheduler also lists whether a particular job is complete or incomplete. The job scheduler can be used as a queue for storing production data requests and/or evaluation requests based on the production data request.

At 1508, the process 1500 determines whether there is a new request. In some examples, this is performed by the evaluation engine 1020. Determining whether there is a new request includes requesting whether the job scheduler includes jobs for execution.

If no new requests are identified (e.g., the answer at 1508 is NO), then at 1510, the process 1500 waits for a certain period of time. In some examples, this is performed by the evaluation engine 1020. The waiting period may be dependent on the job scheduler receiving a request. For example, the process 1500 may wait until the job scheduler notifies it that it has a new request. In some examples, the process 1500 returns periodically (e.g., every few seconds, every few minutes, etc.) to the job schedule.

If new requests are identified (e.g., the answer at 1508 is YES), then at 1512, the process 1500 determines data system(s) to fulfill the request. In some examples, this is performed by the evaluation engine 1020. The data systems can be considered sending systems and characteristics of the production data request are used to identify the sending systems. For example, a production data request may indicate that data meeting the following dimensions be provided: all notes from a type of authorized users received from a particular application operating at a particular entity in a particular geographic market for a particular date range (e.g., Jan. 5, 2016 to Jan. 8, 2016).

At 1514, the process 1500 requests data from the data systems. In some examples, this is performed by the evaluation engine 1020. In some examples, requesting the data includes connecting to the data systems and requesting the production data from the data systems as indicated in the production data request. In some examples, requesting the data from the data systems includes comparing the portion of the production to other similar production data to determine if the portion has changed and updating the portion if it has changed. In this manner, the process 1500 has current production data.

At 1516, the process 1500 provides the requested data. In some examples, this is performed by the data systems 1524. Providing the requested data includes providing the production data in the form of one or more files, as a stream of data including the requested data and updates to the underlying alias records, and the like. In some examples, the production data is retrieved from datasets of the data systems in real time.

At 1518, the process 1500 deidentifies the requested data. In some examples, this is performed by the deidentification engine 1018. Deidentifying the requested data includes performing at least a portion of the sub-process 1400 relating to generating the alias record. For example, deidentifying the requested data includes generating a set of alias records that correspond to the production data request. The requested data may include the set of alias records alone and/or other data including the set of alias records.

At 1520, the process 1500 uses the deidentified data to test element(s). In some examples, this is performed by the evaluation engine 1020. Using the deidentified data to test the elements of the network includes testing the function of the element using the production data. In some examples, the element is an interface, application, system, device, or any other element that processes or outputs production data. In some examples, the element is tested periodically or according to some other schedule. For example, the job scheduler may identify the schedule for executing the test. In this manner, the element can be subject to an ongoing test. Testing the element includes putting the records or messages into the network or to the element for processing, recording outcomes of the processing, debugging errors associated with the processing, and the like.

At 1522, the process 1500 processes the deidentified data. In some examples, this is performed by the element 912. Processing the deidentified data may be part of the test managed by the evaluation engine 1020. In some examples, processing the deidentified data may include saving the data, processing the data, interfacing with the data, using the data to seed another element, sharing the data with another element, and any other process typically performed by the element 912.

Figure 16:
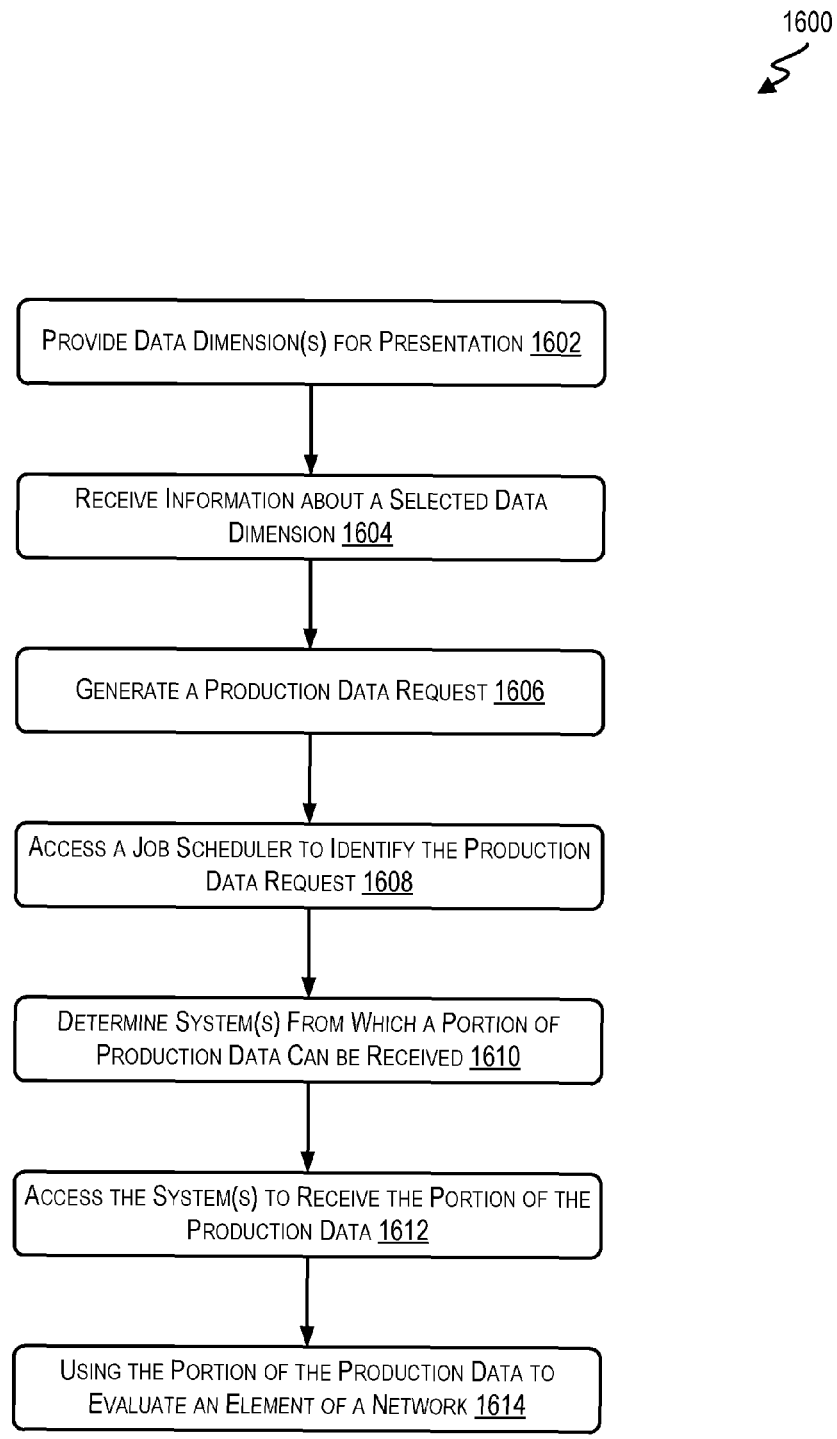
FIG. 16 is a flow diagram depicting example acts for implementing techniques relating to testing network elements using deidentified production data as described herein, according to at least one example.

FIG. 16 depicts the process 1600 including example acts or techniques relating to using deidentified production data to evaluate elements of a computer network, in accordance with at least one embodiment. The deidentification platform 902 (FIG. 9) may perform the process 1600. The process 1600 begins at 1602 by providing data dimension(s) for presentation. In some examples, this is performed by the initiation engine 1014 (FIG. 10). The data dimensions identify characteristics of production data. Providing the data dimensions for presentation includes providing the data dimensions for presentation on a user interface of a user device. In some examples, providing the data dimensions for presentation includes providing a list of data dimensions. In some examples, the data dimensions include one or more of a division dimension, a market dimension, a facility dimension, a source application dimension, or a data type dimension. In some examples, data attributes are examples of the dimensions. In some examples, the process 1600 further provides a selector for presentation. The selector is selectable to initiate deidentification of the portion of the production data by generating or accessing an alias record corresponding to a real record.

At 1604, the process 1600 receives information about a selected data dimension. In some examples, this is performed by the initiation engine 1014. In some examples, the selected data dimension is selected from among the data dimensions presented at 1602. Receiving information about the selected data dimension includes receiving a selection of one or more data dimensions.

At 1606, the process 1600 generates a production data request. In some examples, this is performed by the initiation engine 1014. The production data request can be generated in response to receiving information about the at least one selected data dimension. The production data request can identify one or more characteristics of the production data corresponding to the selected data dimension. The production data request may also identify a date range for which the production data are requested. The production data corresponds to a real record of a user. In some examples, the data range is a future date range or a past date range.

At 1608, the process 1600 accesses a job scheduler to identify the production data request. In some examples, this is performed by the evaluation engine 1020 (FIG. 10). In some examples, the job scheduler includes a plurality of production data requests in addition to the production data request.

At 1610, the process 1600 determines system(s) from which a portion of production data can be received. In some examples, this is performed by the evaluation engine 1020. In some examples, the production data can be received in the form of one or more messages At 1612, the process 1600 accesses the system(s) to receive the portion of the production data. In some examples, this is performed by the evaluation engine 1020. Receiving the portion of the production data can include receiving it as one or more files, via a file transfer protocol, and in any other suitable manner.

At 1614, the process 1600 uses the portion of the production data to evaluate an element of a network. In some examples, this performed by the evaluation engine 1020. In some examples, prior to using the portion of the production data to evaluate the element of the network, the process 1600 further includes deidentifying the production data by performing at least a portion of the sub-process 1400 relating to generating alias records. For example, deidentifying the production data includes generating a set of alias records that correspond to the production data request.

Figure 17:
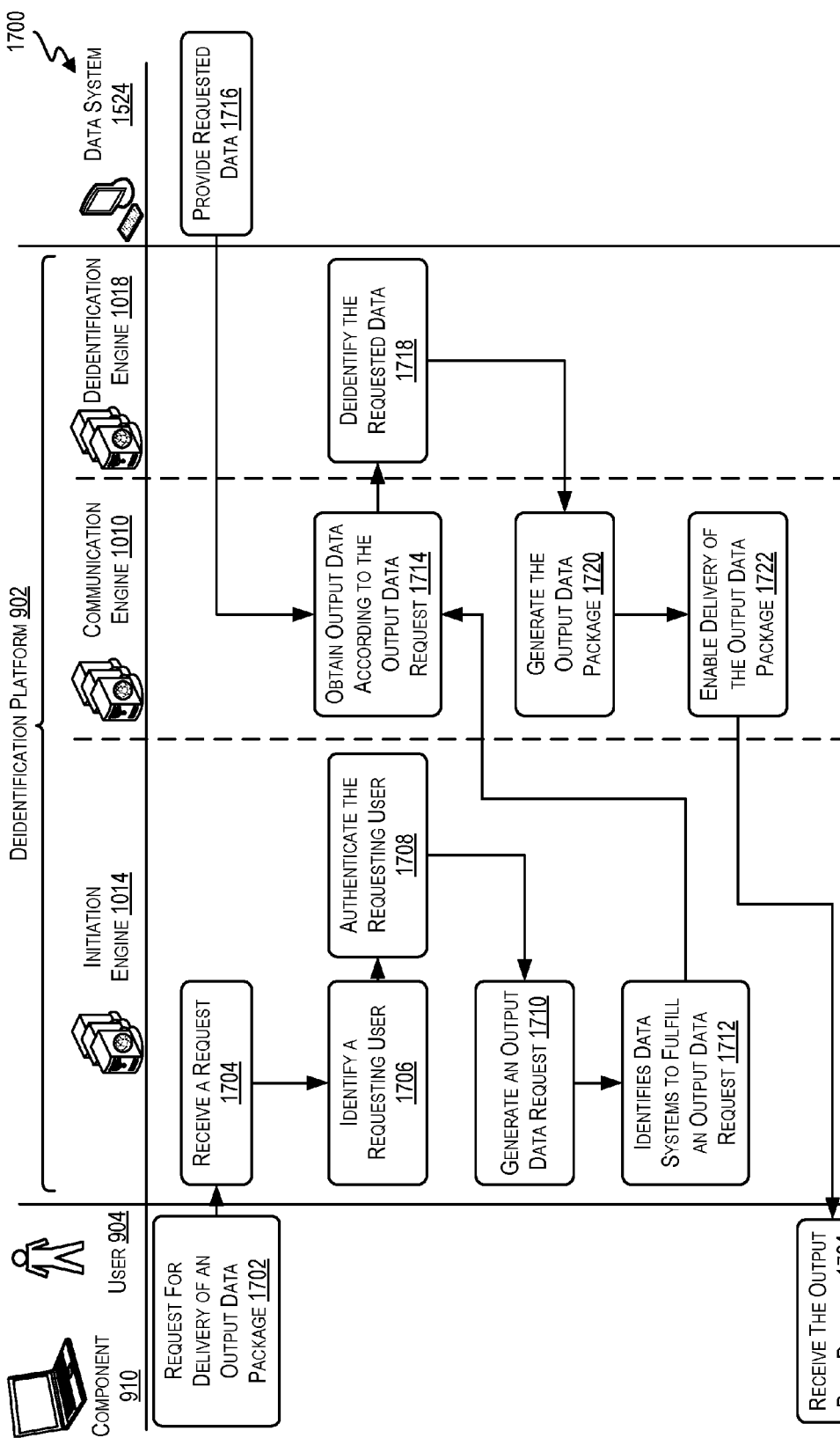
FIG. 17 is a flow diagram depicting example acts for implementing techniques relating to fulfilling requests for production data using deidentified production data as described herein, according to at least one example.

FIG. 17 depicts the process 1700 including example acts or techniques relating to outputting deidentified production data, in accordance with at least one embodiment. The component 910 (FIG. 10), the deidentification platform 902 (FIG. 9), and the data system 1524 (FIG. 15) may perform the process 1700. The process 1700 begins at 1702 by requesting delivery of an output data package (e.g., production data). In some examples, this is performed by the user 904 operating the component 910. In some examples, the user 904 utilizes one of the user interfaces 906 to request delivery of the output data package. In some examples, the user 904 requests delivery by submitting a request to the deidentification platform 902 via the user interface 906. In some examples, the request may be provided and received using Application Programming Interfaces (APIs) (e.g., a set of predefined communication routines). In this manner, third party users may utilize the APIs to submit requests to the deidentification platform 902 and have those requests fulfilled by the deidentification platform 902. The user 904 can be a third party, government entity, researcher, or any other suitable entity. Requesting delivery of the output data package can be received in response to presentation of one or more data dimensions including, for example, a division dimension, a market dimension, a facility dimension, a source application dimension, and/or a data type dimension. The one or more data dimensions are examples of filters that can be applied to the output data which are used by the system to identify the appropriate systems for retrieving the output data. In some examples, the one or more data dimensions are presented to the user via a user interface.

At 1704, the process 1700 receives a request. In some examples, this is performed by the initiation engine 1014 (FIG. 17). The request may be associated with the request for delivery of an output data package of 1702. For example, the request may originate at the component 910. In some examples, the request is a request for an output data package in the form of a data feed or a bulk package. In some examples, the request is a request to subscribe to the data feed including the output data. The request may include information for identifying the entity and/or user associated with the request.

At 1706, the process 1700 identifies a requesting user associated with the request. In some examples, this is performed by the initiation engine 1014. For example, the user submits the request via a user interface which requires the user to log in prior to submitting the request. In this manner, the user can be identified. Identifying the requesting user may also be performed by parsing the request.

At 1708, the process 1700 authenticates the requesting user. In some examples, this is performed by the initiation engine 1014. Authenticating the requesting user includes confirming that the requesting user is authorized to receive the requested data. For example, in order to avoid data breaches, the deidentification platform 902 may include an authorization engine used to authorize users and/or user requests. The authorization engine may rely on one or more authorization rules and/or authorization conditions to which users, user devices, and requests may be evaluated. In some examples, the authorization rules and/or authorization conditions describe the conditions under which a user may be entitled to output data.

At 1710, the process 1700 generates an output data request. In some examples, this is performed by the initiation engine 1014. The output data request identifies characteristics of the output data that are to be included in the output data request. In some examples, the output data request will include output data that is filtered using a data dimension. The output data request, in some examples, identifies the requestor (e.g., the user), the data requested (e.g., the one or more selected dimensions), a time range, whether deidentified, and a delivery location (e.g., a device associated with the user). In some examples, the output data request functions as a subscription to receive a feed of output data based on the dimensions and other information identified above. For example, the user may request an output data feed that includes output data for all users who were treated for a particular condition, or for a subset of users that were treated for the a different condition in a particular region, or any other suitable combination of characteristics. The user may desire such production data for research purposes, for testing purposes, for reporting purposes, or for any other suitable purpose.

At 1712, the process 1700 identifies data systems to fulfill an output data request. In some examples, this is performed by the initiation engine 1014. The data systems can be considered sending systems and characteristics of the output data request are used to identify the sending systems.

At 1714, the process 1700 obtains output data according to the output data request. In some examples, this is performed by the communication engine 1010 (FIG. 10). Obtaining the output data can include requesting the output data from the data systems. The output data may be obtained from the data systems in any suitable manner. The data systems include at least one of a deidentification database, a computing component, or a transformative processing engine. In some examples, obtaining the output data includes retrieving an alias record from the deidentification database by identifying the alias record in the deidentification database using the one or more data dimensions. The deidentification database includes the alias record and a plurality of other alias records corresponding to other real records of other users. Obtaining the output data also includes receiving the alias record from the computing component in the form of a message. Obtaining the output data also includes retrieving the alias record from a data store associated with the transformative processing engine. The data store can include the alias record and the real record. In some examples, obtaining the output data includes intercepting a plurality of messages from at least one data of the data systems. Each message of the plurality of messages can include output data corresponding to a respective real record of a respective user. Obtaining the output data can also include identifying, based on the one or more data dimensions, a particular message of the plurality of messages that includes particular output data having at least one characteristic of the one or more characteristics. The particular message can correspond to the real record of the user. In some examples, the request is made using a first set of predefined communication routines.

At 1716, the process 1700 provides requested data. In some examples, this is performed by the data systems 1524 (FIG. 15). In response to 1714, the data systems 1524 provide the requested data. The requested data can be provided in any suitable manner.

At 1718, the process 1700 deidentifies the requested data. In some examples, this is performed by the deidentification engine 1018 (FIG. 10). Deidentifying the requested data includes performing at least a portion of the sub-process 1400 relating to generating alias records. For example, deidentifying the requested data includes generating a set of alias records that correspond to the requested data. The requested data may include the set of alias records alone and/or other data including the set of alias records.

At 1720, the process 1700 generates the output data package. In some examples, this is performed by the communication engine 1010. Generating the output data package includes compiling the deidentified data (e.g., at least a set of alias records) into a bulk data package, a data feed, or other comparable delivery method.

At 1722, the process 1700 enables delivery of the output data package. In some examples, this is performed by the communication engine 1010. The output data package includes the set of alias records that have been generated as described herein. In some examples, the output data package includes output data that is not capable of identifying users who are the subjects of the output data obtained at 1714. In some examples, enabling delivery includes sending the output data package to a machine or device associated with the user 904.

Figure 18:
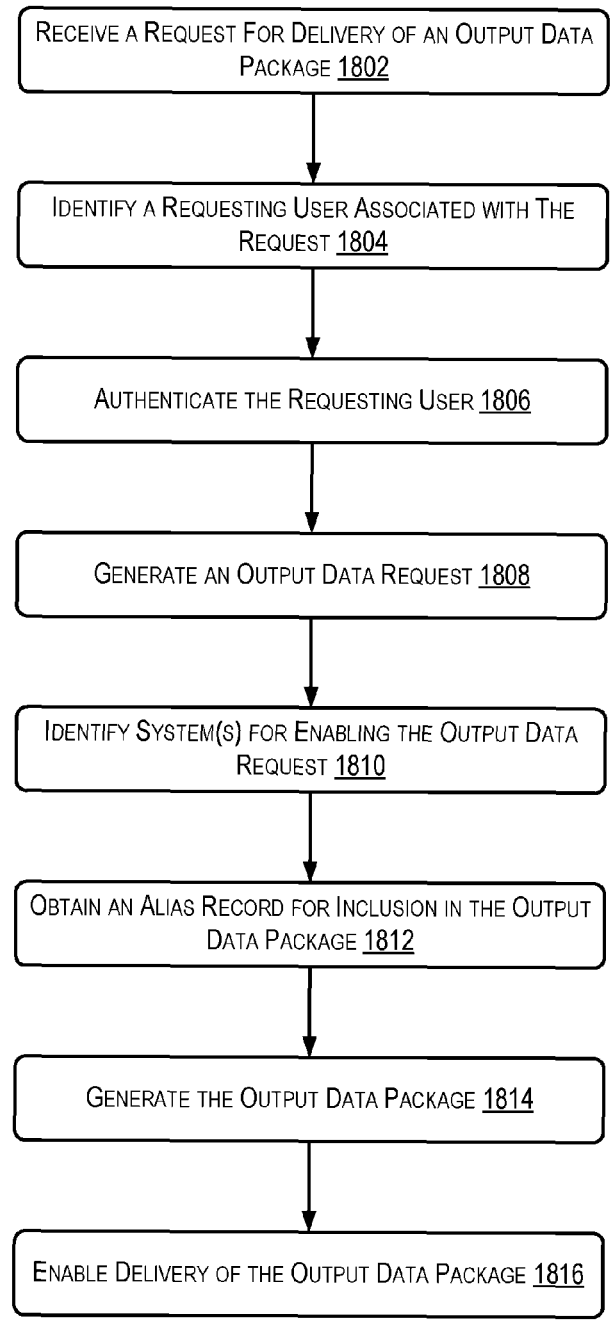
FIG. 18 is a flow diagram depicting example acts for implementing techniques relating to fulfilling requests for production data using deidentified production data as described herein, according to at least one example.

At 1724, the process 1700 receives the output data package. In some examples, this is performed by the component 910. Receiving the output data package can include receiving the output data package at the component 910 (e.g., a machine, device, server, database, etc.). For example, the user may be a third party and the output data package may be provided to a server of the third party. The third party may then user the portion of the message to perform one or more tests on its applications, interfaces, systems, and the like. In some examples, the output data package may be used for wide-spread trials and other tests of user groups. In some examples, the output data package may be used to determine whether a user would qualify for a certain trial. The initial analysis may be performed using the alias record corresponding to the real record of the user. If this analysis qualifies the user, then the user may be notified. This may enable selection of user pools and initial analysis without concern of disclosing identifying information FIG. 18 depicts the process 1800 including example acts or techniques relating to outputting deidentified production data, in accordance with at least one embodiment. The deidentification platform 902 (FIG. 9) may perform the process 1800. The process 1800 begins at 1802 by receiving a request for delivery of an output data package (e.g., production data). In some examples, this is performed by the initiation engine 1014 (FIG. 10). The request includes one or more data attributes identifying one or more characteristics of output data that are requested for inclusion in the output data package. In some examples, the one or more data attributes are examples of one or more data dimensions described herein.

At 1804, the process 1800 identifies a requesting user associated with the request. In some examples, this is performed by the initiation engine 1014. Identifying the requesting user may be based on the request. For example, the request can be parsed to identify the user. In some examples, certain information in the request may be used to identify the user.

At 1806, the process 1800 authenticates the requesting user. In some examples, this is performed by the initiation engine 1014. Authenticating the requesting user can be based on one or more authentication rules. These rules may indicate the conditions under which the requesting user can receive output data from the deidentification platform 902.

At 1808, the process 1800 generates an output data request. In some examples, this is performed by the initiation engine 1014. The output data request can be generated in response to authenticating the requesting user. In some examples, the output data request identifies the one or more data attributes of the output data. The output data request can include a bulk data request or a feed data request.

At 1810, the process 1800 identifies systems for enabling the output data request. In some examples, this is performed by the initiation engine 1014.

At 1812, the process 1800 obtains an alias record for inclusion in the output data package. In some examples, this is performed by the communication engine 1010 (FIG. 10). Obtaining the alias record can be from the one or more systems and based on the one or more data attributes. The alias record corresponds to a real record of a user. The alias record includes a set of alias attributes that is generated by randomizing, anonymizing, and/or deidentifying real information in a set of real attributes belonging to the real record to generate alias information in the set of alias attributes. For example, the alias record can be generated by performing at least a portion of the sub-process 1400 relating to generating alias records. For example, deidentifying the requested data includes generating a set of alias records that correspond to the requested data. The requested data may include the set of alias records alone and/or other data including the set of alias records.

At 1814, the process 1800 generates the output data package. In some examples, this is performed by the communication engine 1010. The output package includes the alias record obtained previously.

At 1816, the process 1800 enables delivery of the output data package. In some examples, this is performed by the communication engine 1010. The output data package may be delivered to the requesting user. In some examples, enabling delivery of the output data package includes sending the output data package to the requesting users using a second set of predefined communication routines. In some examples, the output data package is used by the requesting user to evaluate one or more elements of a network.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, and volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for generating alias records, the system comprising:
a communication engine that:
receives a medical message from a sending system within a network, the medical message comprising a set of data segments storing data corresponding to a real medical record of a patient and being generated in response to an event associated with the patient; and
provides the medical message to a receiving system;
a data store comprising one or more association tables capable of storing associations between the alias records and real medical records;
a storage location comprising a database system capable of storing the alias records; and
a deidentification engine that:
identifies, based at least in part on the medical message, a real identity of the patient;
accesses, using the real identity of the patient, the data store to determine that an alias record corresponding to the real medical record of the patient does not exist, the alias record representing an alias patient that is distinct from the patient;
generates the alias record corresponding to the real medical record of the patient by at least:
determining an alias identity data attribute that uniquely identifies the alias record and corresponds in format and gender to the real identity of the patient;
changing a set of real data attributes belonging to the real record to generate a set of alias data attributes by:
deidentifying a first real data attribute of the set of real data attributes to generate a first alias data attribute of the set of alias data attributes in a first format that is the same as the first real data attribute;
anonymizing a second real data attribute of the set of real data attributes to generate a second alias data attribute of the set of alias data attributes in a second format that is the same as the second real data attribute; and
randomizing a third real data attribute of the set of real data attributes to generate a third alias data attribute of the set of alias data attributes in a third format that is the same as the third real data attribute; and
comparing the alias record and the real medical record to confirm that at least one real data attribute comprising first data is different from at least one alias data attribute comprising second data;
generates an identifier that associates the alias record with the real medical record; and
stores the generated alias record in the database system at the storage location, wherein the identifier is usable to persist changes to the generated alias record and to retrieve the generated alias record from the database system.

2. The system of claim 1, wherein the event comprises an adjustment to the real medical record of the patient.

3. The system of claim 1, wherein deidentifying the first real data attribute of the set of real data attributes to generate the first alias data attribute comprises deidentifying at least one of:

a real first name and a real second name of the patient to generate an alias first name and an alias second name that are distinct from the real first name and the real second name;

a real organizational identifier of the patient to generate an alias organizational identifier that is distinct from the real organizational identifier;

a real nine-character identifier of the patient to generate an alias nine-character identifier that is distinct from the real nine-character identifier; or a real geographic locator of the patient to generate an alias geographic locator that is distinct from the real geographic locator.

4. The system of claim 1, wherein randomizing the third real data attribute of the set of real data attributes to generate the third alias data attribute comprises randomizing at least one of:

a real contact number of the patient to generate an alias contact number that is distinct from the real contact number, the alias contact number sharing a three-character code with the real contact number;

a real birth identifier of the patient to generate an alias birth identifier that is distinct from the real birth identifier, the alias birth identifier sharing a birth year with the real birth identifier; or a real coverage identifier of the patient to generate an alias coverage identifier that is distinct from the real coverage identifier.

5. The system of claim 1, wherein anonymizing the second real data attribute of the set of real data attributes to generate the second alias data attribute comprises anonymizing at least one of:

a real support entity identifier of the patient to generate an alias support entity identifier that is distinct from the real support entity identifier; and a real authorized user identifier associated with treatment of the patient to generate an alias authorized user identifier that is distinct from the real authorized user identifier.

6. The system of claim 1, wherein the one or more association tables comprises the identifier and other identifiers, each of the other identifiers associating a respective alias record with a respective real medical record.

7. The system of claim 1, wherein the identifier comprises a unique alphanumeric identifier or a unique association of a facility identifier that identifies a facility from which the medical message originated, an application identifier that identifies an application from which the medical message originated, and an entity identifier that uniquely identifies an association between the patient and an entity.

8. The system of claim 1, wherein the medical message comprises a generated medical message generated by a component of the network and intercepted by the communication engine, a transformative medical message generated by a transformative processing engine and retrieved from the transformative processing engine by the communication engine, or a record medical message stored in a database of the data store and retrieved by the communication engine from the database.

9. A computer-implemented method for generating alias records, the method comprising:

receiving a medical message from a sending system within a network, the medical message comprising a set of data segments storing data corresponding to a real medical record of a patient and being generated in response to an event associated with the patient;

identifying, based at least in part on the medical message, a real identity of the patient;

accessing, using the real identity of the patient, an association table to determine that an alias record corresponding to the real medical record of the patient does not exist, the alias record representing an alias patient that is distinct from the patient;

generating the alias record corresponding to the real medical record of the patient by at least:

determining an alias identity data attribute that uniquely identifies the alias record and corresponds in format and gender to the real identity of the patient;

changing a set of real data attributes belonging to the real medical record to generate a set of alias data attributes by:

deidentifying a first real data attribute of the set of real data attributes to generate a first alias data attribute of the set of alias data attributes in a first format that is the same as the first real data attribute;

anonymizing a second real data attribute of the set of real data attributes to generate a second alias data attribute of the set of alias data attributes in a second format that is the same as the second real data attribute; and randomizing a third real data attribute of the set of real data attributes to generate a third alias data attribute of the set of alias data attributes in a third format that is the same as the third real data attribute; and comparing the alias record and the real medical record to confirm that at least one real data attribute comprising first data is different from at least one alias data attribute comprising second data;

generating an identifier that associates the alias record with the real medical record;

storing the generated alias record in a database system at a storage location, the identifier usable to persist changes to the generated alias record and to retrieve the generated alias record from the database system; and providing the medical message to a receiving system identified by the medical message.

10. The computer-implemented method of claim 9, wherein deidentifying the first real data attribute of the set of real data attributes to generate the first alias data attribute comprises deidentifying at least one of:

a real first name and a real second name of the patient to generate an alias first name and an alias second name that are distinct from the real first name and the real second name;

a real organizational identifier of the patient to generate an alias organizational identifier that is distinct from the real organizational identifier;

a real nine-character identifier of the patient to generate an alias nine-character identifier that is distinct from the real nine-character identifier; or a real geographic locator of the patient to generate an alias geographic locator that is distinct from the real geographic locator.

11. The computer-implemented method of claim 9, wherein randomizing the third real data attribute of the set of real data attributes to generate the third alias data attribute comprises randomizing at least one of:

a real contact number of the patient to generate an alias contact number that is distinct from the real contact number, the alias contact number sharing a three-character code with the real contact number;
a real birth identifier of the patient to generate an alias birth identifier that is distinct from the real birth identifier, the alias birth identifier sharing a birth year with the real birth identifier; or
a real coverage identifier of the patient to generate an alias coverage identifier that is distinct from the real coverage identifier.

12. The computer-implemented method of claim 9, wherein the real identity of the patient comprises a real first name and a real second name of the patient.

13. The computer-implemented method of claim 9, wherein the association table comprises the identifier and other identifiers, each of the other identifiers associating a respective alias record with a respective real medical record.

14. The computer-implemented method of claim 9, wherein the identifier comprises a unique alphanumeric identifier or a unique association of a facility identifier that identifies a facility from which the medical message originated, an application identifier that identifies an application from which the medical message originated, and an entity identifier that uniquely identifies an association between the patient and an entity.

15. One or more computer-readable storage devices for storing computer-executable instructions that, when executed by one or more computer systems, configure the one or more computer systems to perform operations for generating alias records, the operations comprising:
receiving a medical message from a sending system within a network, the medical message comprising a set of data segments storing data corresponding to a real medical record of a patient and being generated in response to an event associated with the patient;
identifying, based at least in part on the medical message, a real identity of the patient;
accessing, using the real identity of the patient, an association table to determine that an alias record corresponding to the real medical record of the patient does not exist, the alias record representing an alias patient that is distinct from the patient;
generating the alias record corresponding to the real medical record of the patient by at least:
determining an alias identity data attribute that uniquely identifies the alias record and corresponds in format and gender to the real identity of the patient;
changing a set of real data attributes belonging to the real medical record to generate a set of alias data attributes by:
deidentifying a first real data attribute of the set of real data attributes to generate a first alias data attribute of the set of alias data attributes in a first format that is the same as the first real data attribute;
anonymizing a second real data attribute of the set of real data attributes to generate a second alias data attribute of the set of alias data attributes in a second format that is the same as the second real data attribute; and
randomizing a third real data attribute of the set of real data attributes to generate a third alias data attribute of the set of alias data attributes in a third format that is the same as the third real data attribute; and
comparing the alias record and the real medical record to confirm that at least one real data attribute comprising first data is different from at least one alias data attribute comprising second data;
generating an identifier that associates the alias record with the real medical record;
storing the generated alias record in a database system at a storage location, the identifier usable to persist changes to the generated alias record and to retrieve the generated alias record from the database system; and
providing the medical message to a receiving system identified by the medical message.

16. The one or more computer-readable storage devices of claim 15, wherein the real identity of the patient comprises a real first name and a real second name of the patient.

17. The one or more computer-readable storage devices of claim 15, wherein deidentifying the first real data attribute of the set of real data attributes to generate the first alias data attribute comprises deidentifying at least one of:
a real first name and a real second name of the patient to generate an alias first name and an alias second name that are distinct from the real first name and the real second name;
a real organizational identifier of the patient to generate an alias organizational identifier that is distinct from the real organizational identifier;
a real nine-character identifier of the patient to generate an alias nine-character identifier that is distinct from the real nine-character identifier; or
a real geographic locator of the patient to generate an alias geographic locator that is distinct from the real geographic locator.

18. The one or more computer-readable storage devices of claim 15, wherein randomizing the third real data attribute of the set of real data attributes to generate the third alias data attribute comprises randomizing at least one of:
a real contact number of the patient to generate an alias contact number that is distinct from the real contact number, the alias contact number sharing a three-character code with the real contact number;
a real birth identifier of the patient to generate an alias birth identifier that is distinct from the real birth identifier, the alias birth identifier sharing a birth year with the real birth identifier; or
a real coverage identifier of the patient to generate an alias coverage identifier that is distinct from the real coverage identifier.

19. The one or more computer-readable storage devices of claim 15, wherein anonymizing the second real data attribute of the set of real data attributes to generate the second alias data attribute comprises anonymizing at least one of:
a real support entity identifier of the patient to generate an alias support entity identifier that is distinct from the real support entity identifier; and
a real authorized user identifier associated with treatment of the patient to generate an alias authorized user identifier that is distinct from the real authorized user identifier.

20. The one or more computer-readable storage devices of claim 15, wherein the identifier comprises a unique alphanumeric identifier or a unique association of a facility identifier that identifies a facility from which the medical message originated, an application identifier that identifies an application from which the medical message originated, and an entity identifier that uniquely identifies an association between the patient and an entity.

* * * * *